US012451615B2

(12) United States Patent
Pelletier et al.

(10) Patent No.: US 12,451,615 B2
(45) Date of Patent: Oct. 21, 2025

(54) BROADBAND HIGH-POWER PYLON ANTENNA

(71) Applicant: DIELECTRIC, LLC, Raymond, ME (US)

(72) Inventors: Keith Pelletier, Raymond, ME (US); Nicole Starrett, Raymond, ME (US); Craig Beaucage, Raymond, ME (US); James Butts, Raymond, ME (US)

(73) Assignee: Dielectric, LLC, Raymond, ME (US)

( * ) Notice: Subject to any disclaimer, the term of this patent is extended or adjusted under 35 U.S.C. 154(b) by 288 days.

(21) Appl. No.: 18/143,233

(22) Filed: May 4, 2023

(65) Prior Publication Data

US 2023/0369779 A1 Nov. 16, 2023

Related U.S. Application Data

(60) Provisional application No. 63/341,076, filed on May 12, 2022.

(51) Int. Cl.

*H01Q 21/00* (2006.01)
*H01Q 5/47* (2015.01)
*H01Q 21/06* (2006.01)

(52) U.S. Cl.

CPC ........... *H01Q 21/0062* (2013.01); *H01Q 5/47* (2015.01); *H01Q 21/064* (2013.01)

(58) Field of Classification Search

CPC .... H01Q 21/0062; H01Q 5/47; H01Q 21/064; H01Q 13/203

See application file for complete search history.

(56) References Cited

U.S. PATENT DOCUMENTS

| | | | | |
|---|---|---|---|---|
| 5,809,429 | A * | 9/1998 | Knop | H04B 5/28 455/523 |
| 6,320,555 | B1 * | 11/2001 | Schadler | H01Q 21/0062 343/791 |
| 7,498,906 | B2 * | 3/2009 | Pirard | H01Q 13/203 333/237 |
| 2018/0145728 | A1 * | 5/2018 | Tsukamoto | H04B 5/28 |
| 2021/0135372 | A1 * | 5/2021 | Adams | H01Q 3/36 |
| 2024/0014567 | A1 * | 1/2024 | Song | H01P 3/06 |
| 2024/0030622 | A1 * | 1/2024 | Rotenberg | H01P 9/006 |

* cited by examiner

*Primary Examiner* — Dimary S Lopez Cruz
*Assistant Examiner* — Austin M Back
(74) *Attorney, Agent, or Firm* — IceMiller LLP

(57) ABSTRACT

A high power top mounted slotted coaxial broadcast antenna for broadband multi-channel applications is achieved via applying phase cancelation through multiple feeds. The effect that external transmission line feeds have on the circularity of the azimuth pattern is reduced using parasitic tubes near the surface of the slot apertures.

16 Claims, 24 Drawing Sheets

BROADBAND HIGH-POWER PYLON ANTENNA

CROSS-REFERENCE TO RELATED APPLICATIONS

This application claims priority to U.S. Provisional Application No. 63,341,076, filed May 12, 2022, entitled "Broadband High-Power Pylon Antenna," the disclosure of which is hereby incorporated by reference in its entirety.

BACKGROUND

Slotted coaxial antennas have many advantages over traditional broadband panel antennas including much smaller size and wind load, higher reliability and a greater degree of azimuth and elevation pattern flexibility but suffer from narrow bandwidth. In the past decade, techniques have been applied to increase the bandwidth, but have been limited to side mounted antenna configurations in the UHF range.

SUMMARY

High power top mounted slotted coaxial broadcast antennas can be used for broadband multi-channel applications. The top mounted configurations feature lower cost, lower wind load, and high reliability as compared to panel antennas, for instance. This may be done by applying phase cancelation through multiple feeds. The effect external transmission lines, used for the multiple feeds, has on the circularity of the azimuth pattern can be greatly minimized through the use of parasitic tubes near the surface of the aperture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings. Note that the figures are not to scale.

DETAILED DESCRIPTION

Slotted coaxial antennas have many advantages over traditional broadband panel antennas including much smaller size and wind load, higher reliability and a greater degree of azimuth and elevation pattern flexibility. The one disadvantage of slotted coaxial antennas has been their inherently narrow bandwidth. In most applications their usage is only considered for single channel operation, approximately 1% bandwidth for UHF.

In the past decade, techniques have been applied to increase the bandwidth, but have been limited to side mounted antenna configurations. Top mounted dual channel operation has historically been accomplished by structurally stacking two single channel antennas on top of each other. A disadvantage of this technique could be the effect of the top antenna's feedline has on the circularity of the bottom antenna since it must run through the bottom antenna's aperture.

This disclosure describes phasing and transmission line arranges for broadband slotted coaxial antennas which may be implemented as pylon antennas in single, free standing, top mount configurations which do not suffer the extra wind load associated with the use of two antennas. In some configurations, the use of dummy transmission lines allows the designs to not sacrifice azimuth pattern circularly due to external feedlines.

In the communication industry, what is acceptable VSWR varies widely depending on the application. In some cases, such as broadcast, the VSWR must be close to unity where in other cases it can be as high as 10:1. The frequency bandwidth can be expressed as the ratio of the band of operation to the center frequency as a percent:

$$\% \, bw = \frac{f_h - f_l}{f_0}(100) \quad (1)$$

Figure 1:
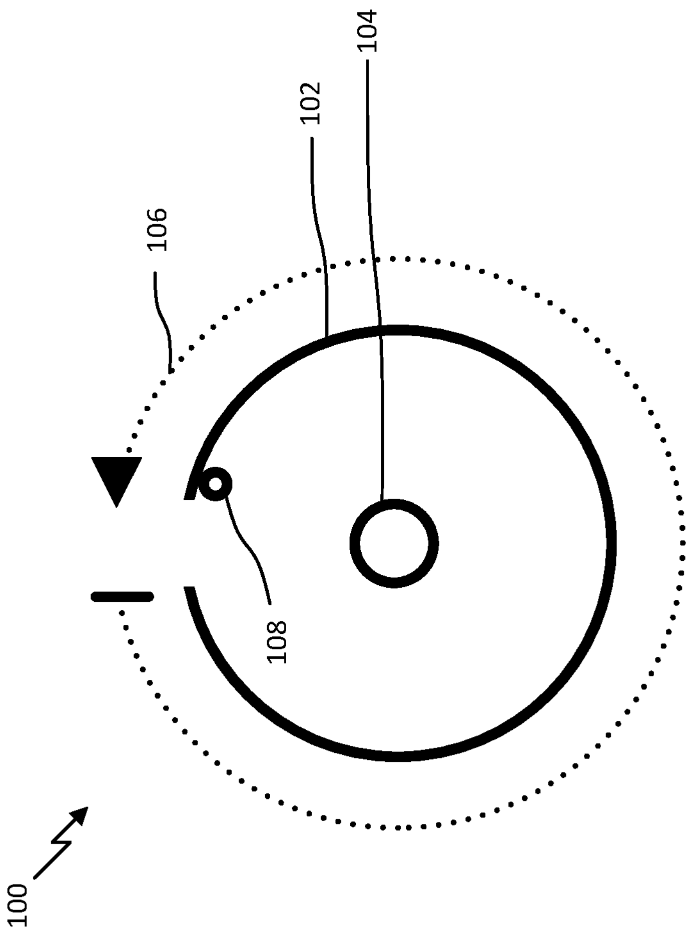
FIG. 1 is a horizontal cross-section of a slotted coaxial antenna.

The natural bandwidth of a coaxial slot radiator is typically on the order of one to two percent depending on the maximum allowable VSWR within the operating bandwidth. FIG. 1 shows a horizontal cross-section of a coaxial slot antenna 100. The structure includes an inner radiator 104, here shown as a pipe, and an aperture layer 102 having a slot with width 106. 108 is a coupler which excites the energy from inside the antenna to the outside pipe and creates the circular current. The fundamental limitation of a coaxial slot stems from the frequency dependence imposed on the structure by connecting the two sides of the slot together by wrapping the outer conductor to form the cylinder of aperture layer 102. The outer conductor of the slotted coaxial antenna creates a frequency dependence, causing narrow band operation.

See John L. Schadler, "Broadband Slotted Coaxial Broadcast Antenna Technology." White Paper, www.dielectric.com, 2014.

Multi-Sectional Phase Cancellation

Feeding broadband panel antennas by a corporate feed network is common practice. It provides a stable elevation pattern frequency response and can provide a level of impedance cancellation if phased correctly. The feed system makes use of the fact that multiple voltage reflections from similar unmatched loads can be made to arrive at a common point in the system, in the proper phase relation, causing a net cancellation to occur. The most cost effective, reliable, and lowest wind load method to feed slotted coaxial antennas is to have a single input feeding multiple slots in parallel. This design eliminates feed lines, power dividers and connections, but does not provide broadband performance. To take advantage of phase cancellation to extend the impedance bandwidth, the slotted coaxial antenna must be broken down into multiple sections as shown in FIG. 2.

Figure 2:
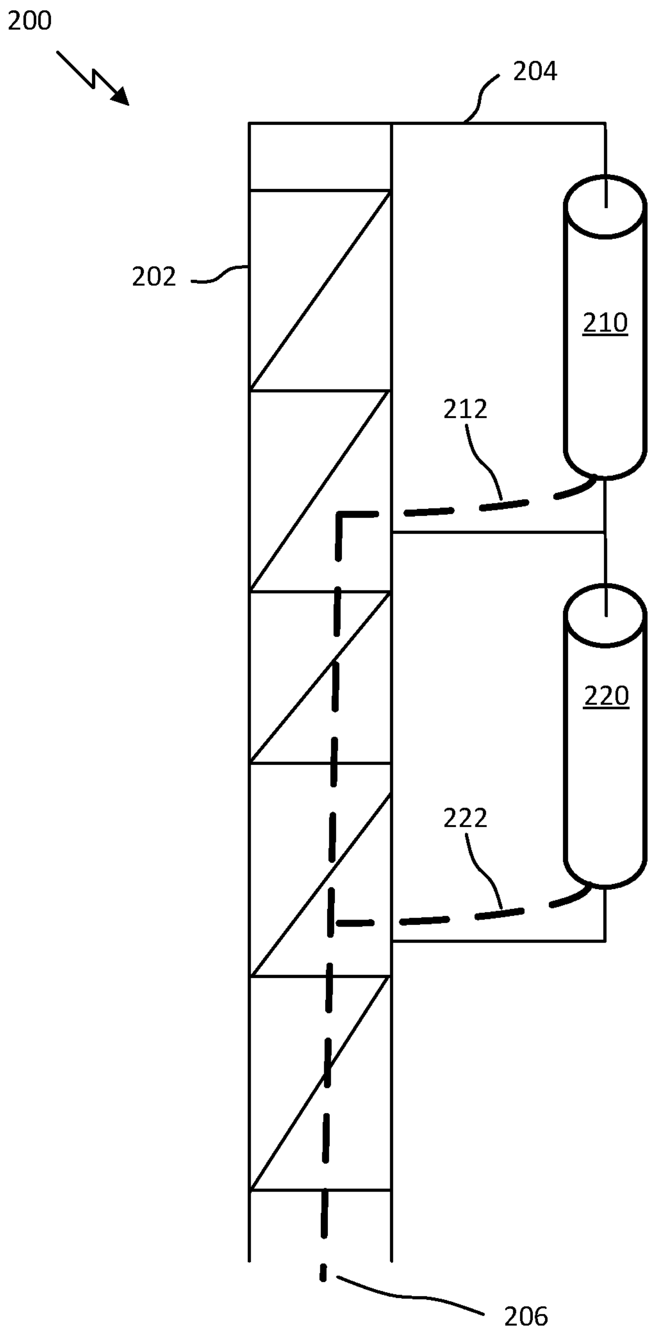
FIG. 2 is a block diagram of a two-section side mounted slotted coaxial antenna on a tower.

In the example of FIG. 2, the antenna 200 has a top section 210 and a bottom section 220 which are fed from below by coupling mechanisms 212 and 222, respectively, from a feed 206 which runs up tower 202. The antenna sections 210 and 220 are attached to the tower via supports 204.

Figure 3:
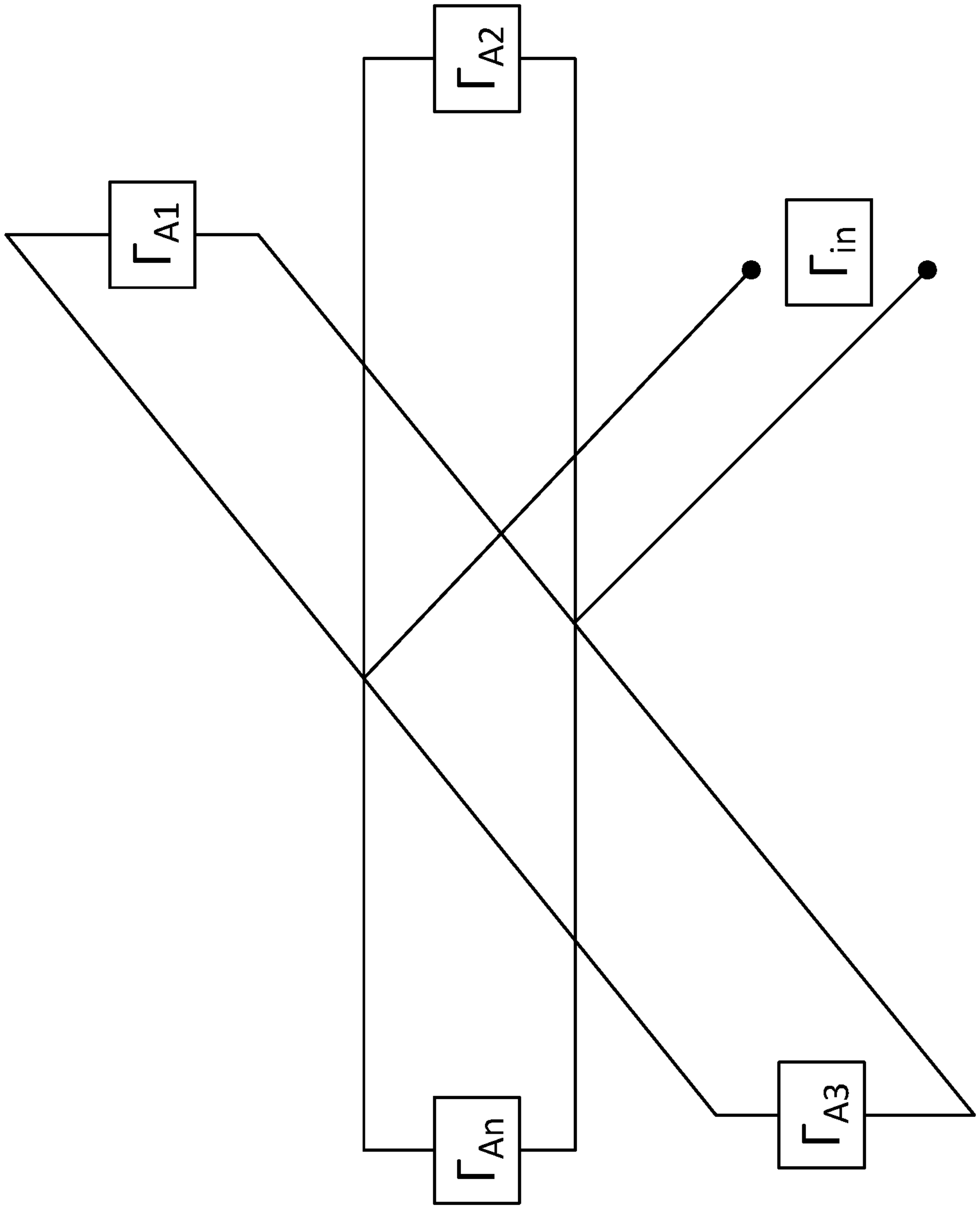
FIG. 3 illustrates an arbitrary number of loads connected in parallel.

To analyze the bandwidth improvement associated with using phase cancellation between antenna sections, an arbitrary number of loads are connected in parallel as shown in FIG. 3. In FIG. 3, $\Gamma_{A_n}$ represents the complex reflection coefficient of the individual antenna sections. Assuming the input combining point is matched to the number of loads, the total system input refection coefficient is the summation of the individual loads or antenna sections each with a phase offset $\emptyset_{l_n}$ looking into each feed line at the feed point divided by the number of sections. See Equation 2.

$$\Gamma_{IN} = \frac{\sum_{p=1}^{n} \Gamma_{A_n} e^{-j2\pi\emptyset_{l_n}}}{n} \quad (2)$$

For the case where $\Gamma_{IN}=0$, full cancelation of all the loads, the phase offset between the loads must be of the solution Equation 3.

$$\emptyset_{ln} = \frac{180}{n} \quad (3)$$

Phase Cancelation and Aperture Efficiency

Aperture efficiency is the figure of merit which defines how effectively the physical area of the antenna is utilized. The gain for which an antenna can provide is given by Equation 4.

$$G = \eta\left(\frac{4\pi}{\lambda^2}\right)A \quad (4)$$

See Warren L. Stutzman, Gary A Thiele, "Antenna Theory and Design" John Wiley & Sons, 1981. In Equation 4, η is the aperture efficiency and A is the area the antenna consumes. Large phase spreads reduce the antennas gain and thus the aperture efficiency, so it is not always possible to achieve full cancellation in practical multi-sectional antenna designs. In general, the greater number of sections or load splits, the more efficient the aperture becomes. It is also true that in general, greater number of load splits provide larger operating bandwidth. This is due to reducing the progressive phase runout across the band from loads placed in series as well as reducing load impedance randomness sensitivity. For example, a 20-layer slotted coaxial antenna can provide a maximum rms gain of 24.27. If split into two sections and fed with the optimum phase offset of 90 degrees between sections, the aperture efficiency is reduced to 85%. If partial cancellation is sufficient to achieve the bandwidth requirements, then this can be improved. If that same antenna is split into four sections with an optimum phase offset of 45 degrees, the aperture efficiency is now 95%.

Practical Application of Phase Cancellation Technique

Figure 4:
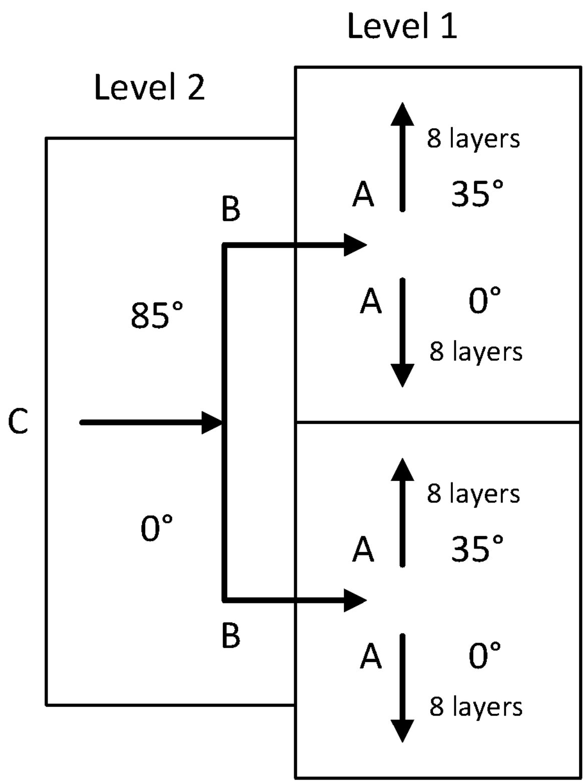
FIG. 4 illustrates phase offsets incorporated into an example 32-layer coaxial antenna.

Desired null fill and beam tilt also dictate how practical aperture illuminations are applied to multi-sectional slotted coaxial antennas. Large phase spread can cause unwanted excessive beam tilt and low aperture efficiency. It is always a trade-off of trying to provide optimum phase offset while maintaining a desired beam tilt, null fill, and gain. The following example illustrates how a 32-layer slotted coaxial UHF broadcast antenna can be optimized for coverage performance and efficiency while adding phase offset to increase the operating bandwidth for multichannel use. The 32-layers are broken into 4 sets of 8 layers and phased in two levels as shown in FIG. 4. This phasing provides increased operating bandwidth while maintaining practical elevation pattern parameters. Note that FIG. 4 is intended to convey the phasing configuration, rather than the physical arrangements of the feeds, which may be achieved in several ways.

Figure 5:
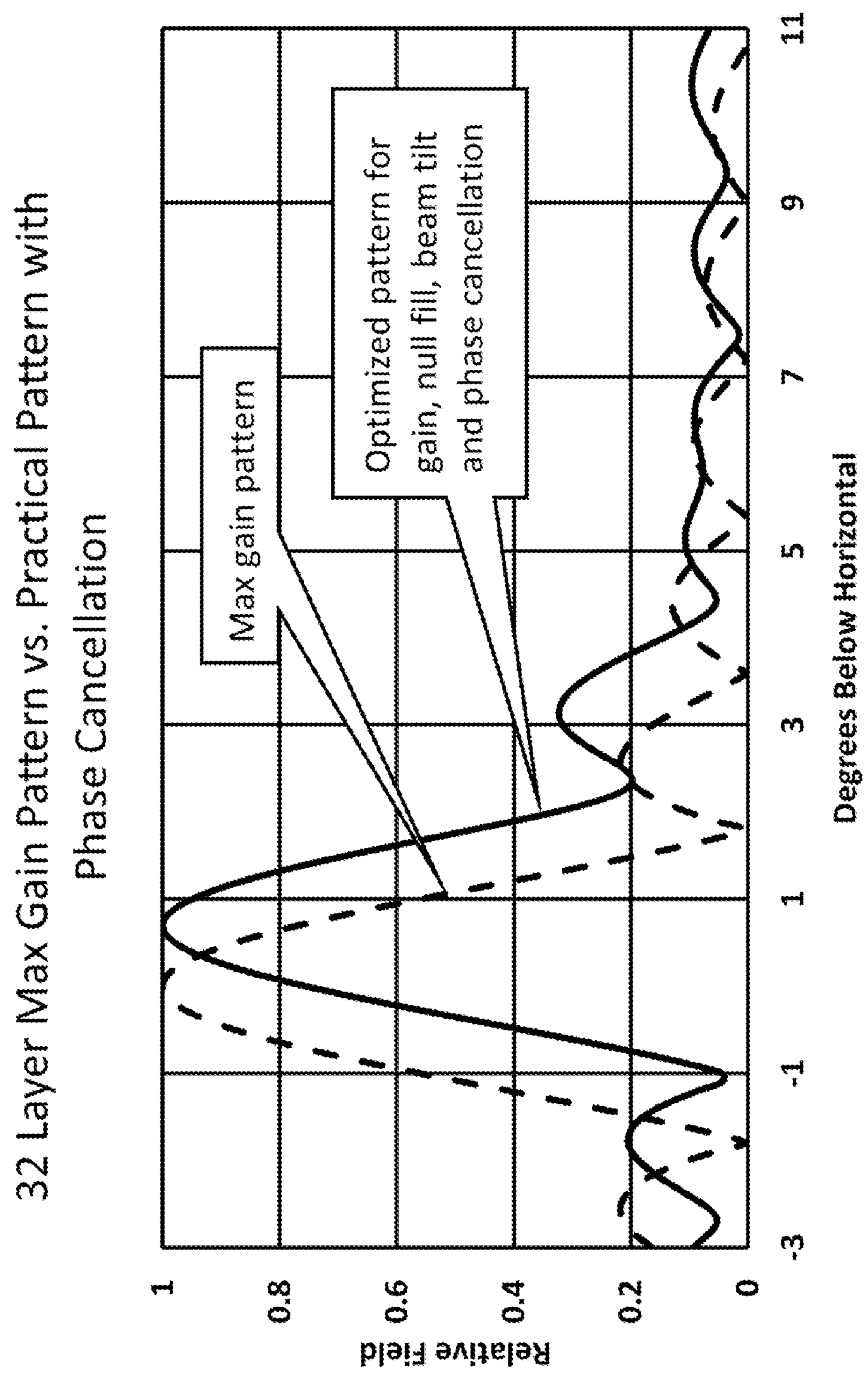
FIG. 5 shows the resulting pattern that can be formed with the phasing shown in FIG. 4.

FIG. 5 shows the resulting pattern that can be formed with the phasing shown in FIG. 4. In FIG. 5, the solid curve is optimized pattern for gain, null fill, beam tilt, and phase cancellation, graphed for relative field vs. degrees below horizontal. This allows increasing the operating bandwidth while maintaining 0.75 degrees of beam tilt, 20% null fill and high gain. The dashed curve represents the maximum gain pattern.

Figure 6A:
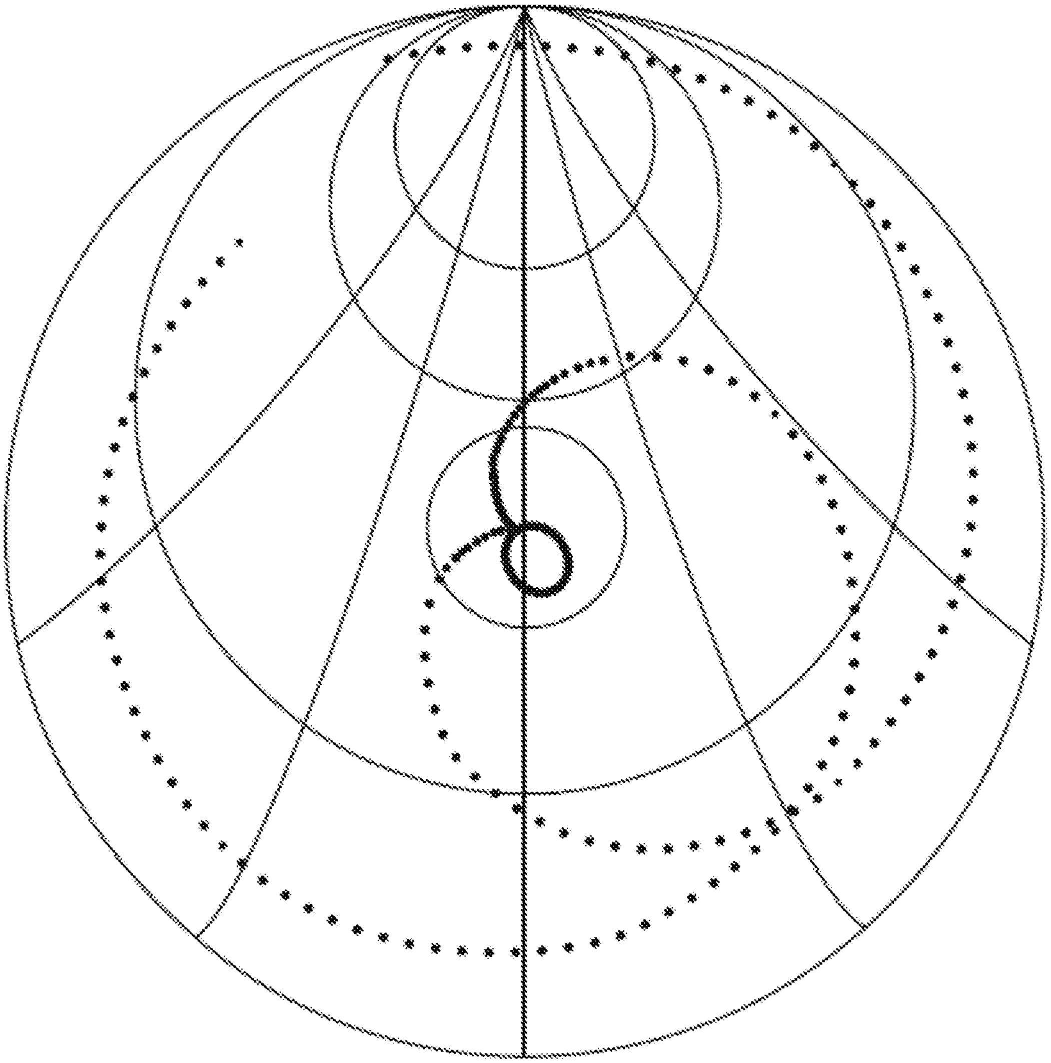
FIGS. 6A and 6B are a Smith chart and a VSWR response graph calculated for a typical 8-layer slotted coaxial antenna.
Figure 6B:
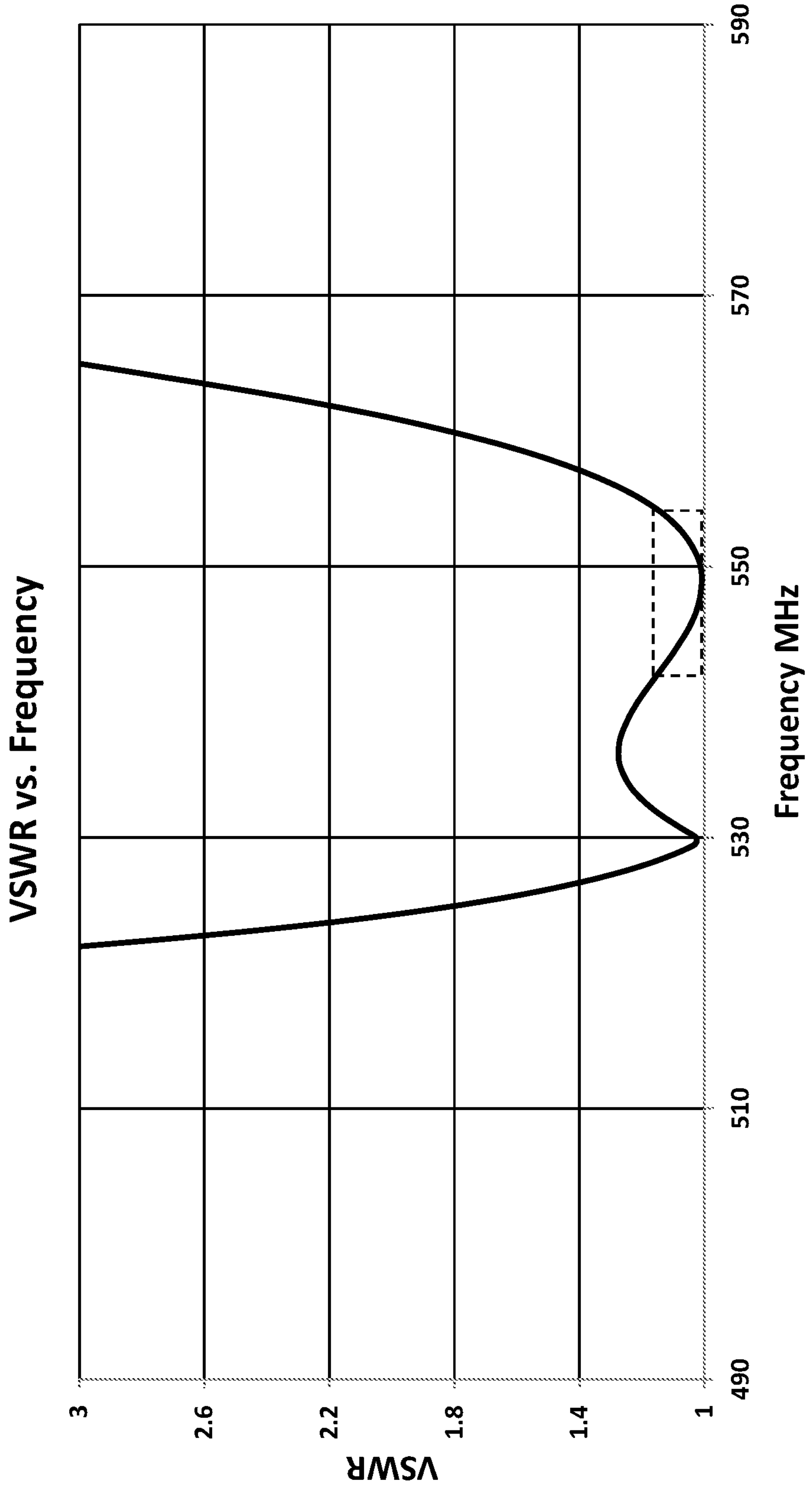

The two-level phase offsets used in this example maintain an aperture efficiency over 90%. To determine the maximum increase in bandwidth that can be realized from the phase cancelation scheme, equations 2 and 3 are used along with the appropriate phase runout vs. frequency. A typical slotted coaxial antenna impedance is shown in FIG. 6A, and the corresponding VSWR response is shown in FIG. 6B. This is the impedance as seen at points A in FIG. 4.

Figure 7A:
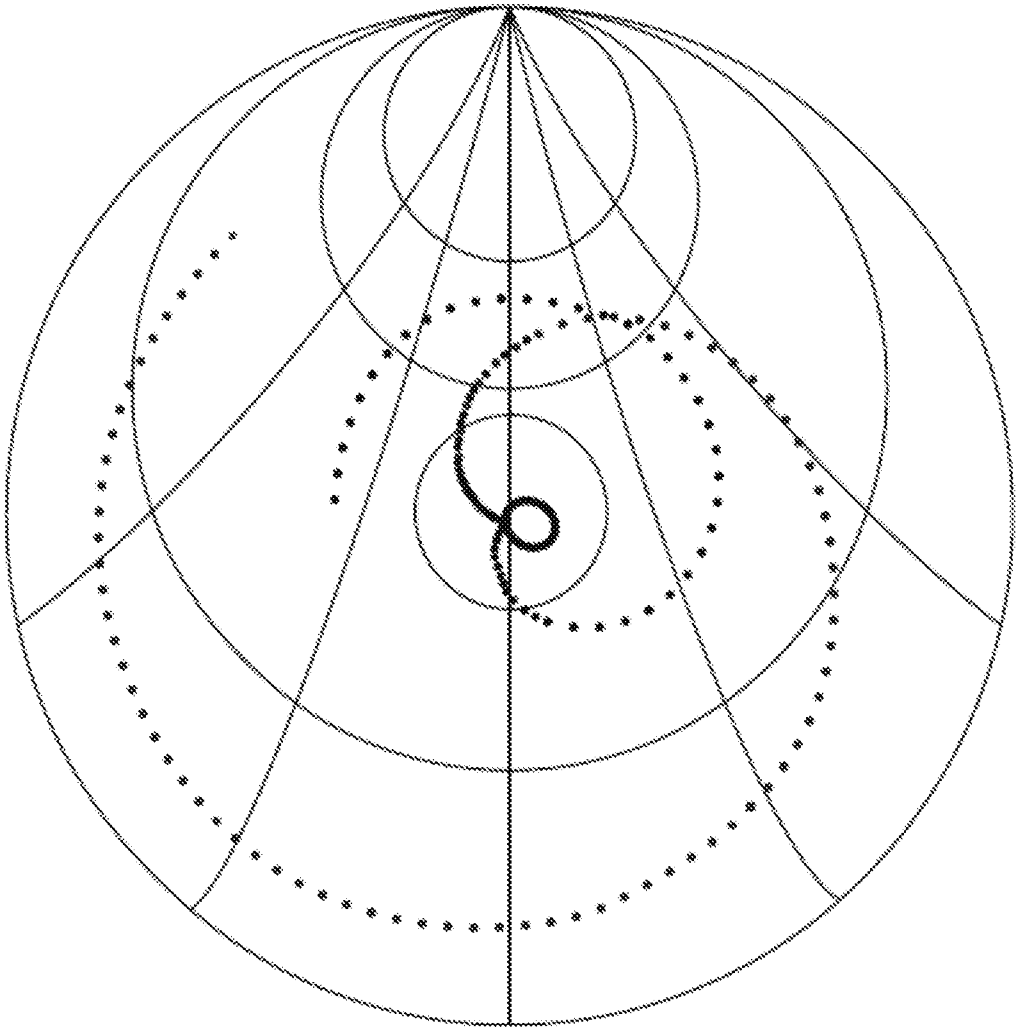
FIGS. 7A and 7B are a Smith chart and a VSWR response graph calculated for points B in FIG. 4.
Figure 7B:
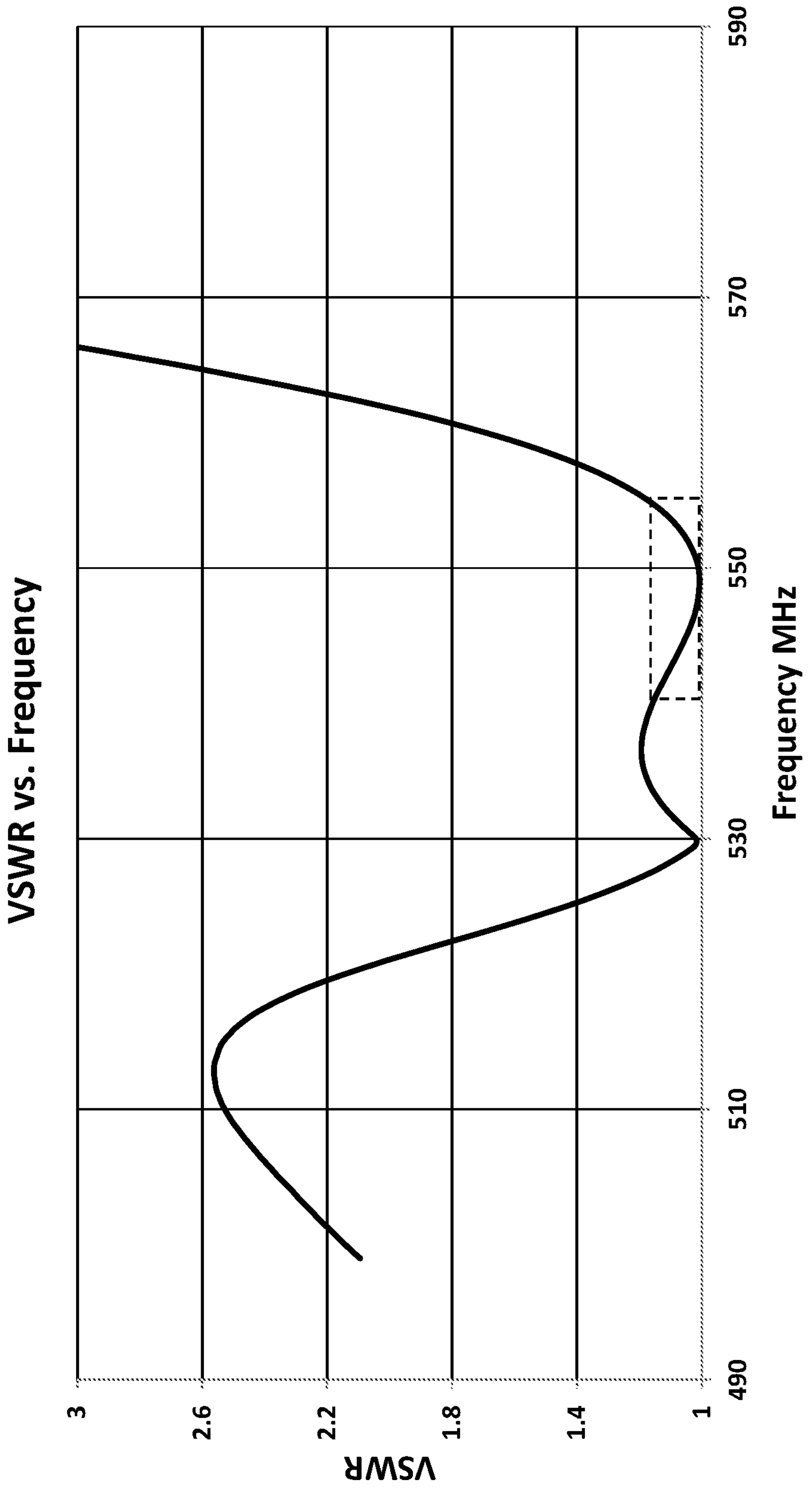

The impedance at points B in FIG. 4 with level 1 cancellation of 35 degree of offset is shown in FIGS. 7A and 7B. The typical response has 2.0% bandwidth at a maximum allowable VSWR of 1.15:1, as shown in the dashed box area of the VSWR vs. Frequency plot of FIG. 7B. This dashed box marking is used as well in the other VSWR plots herein.

Figure 8A:
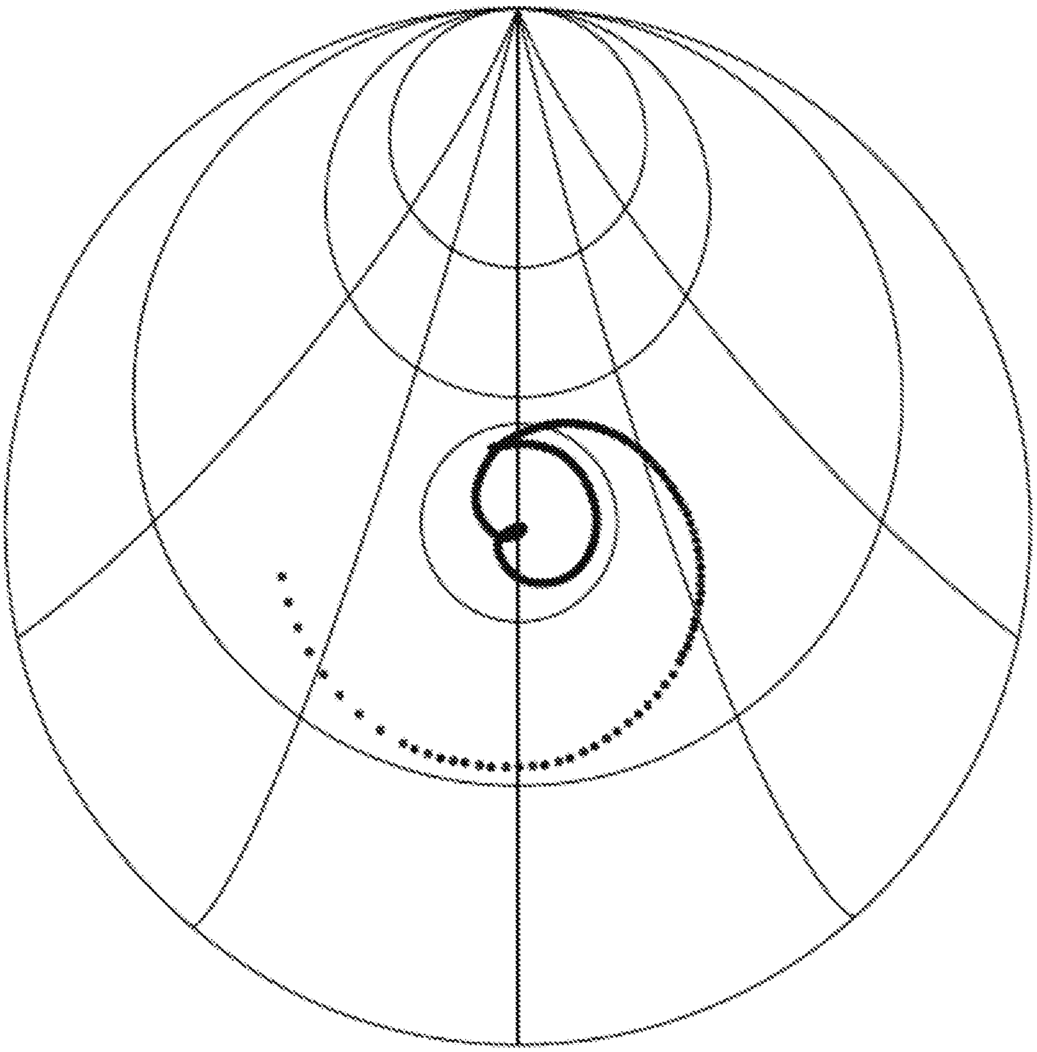
FIGS. 8A and 8B are a Smith chart and a VSWR response graph calculated for point C in FIG. 4.
Figure 8B:
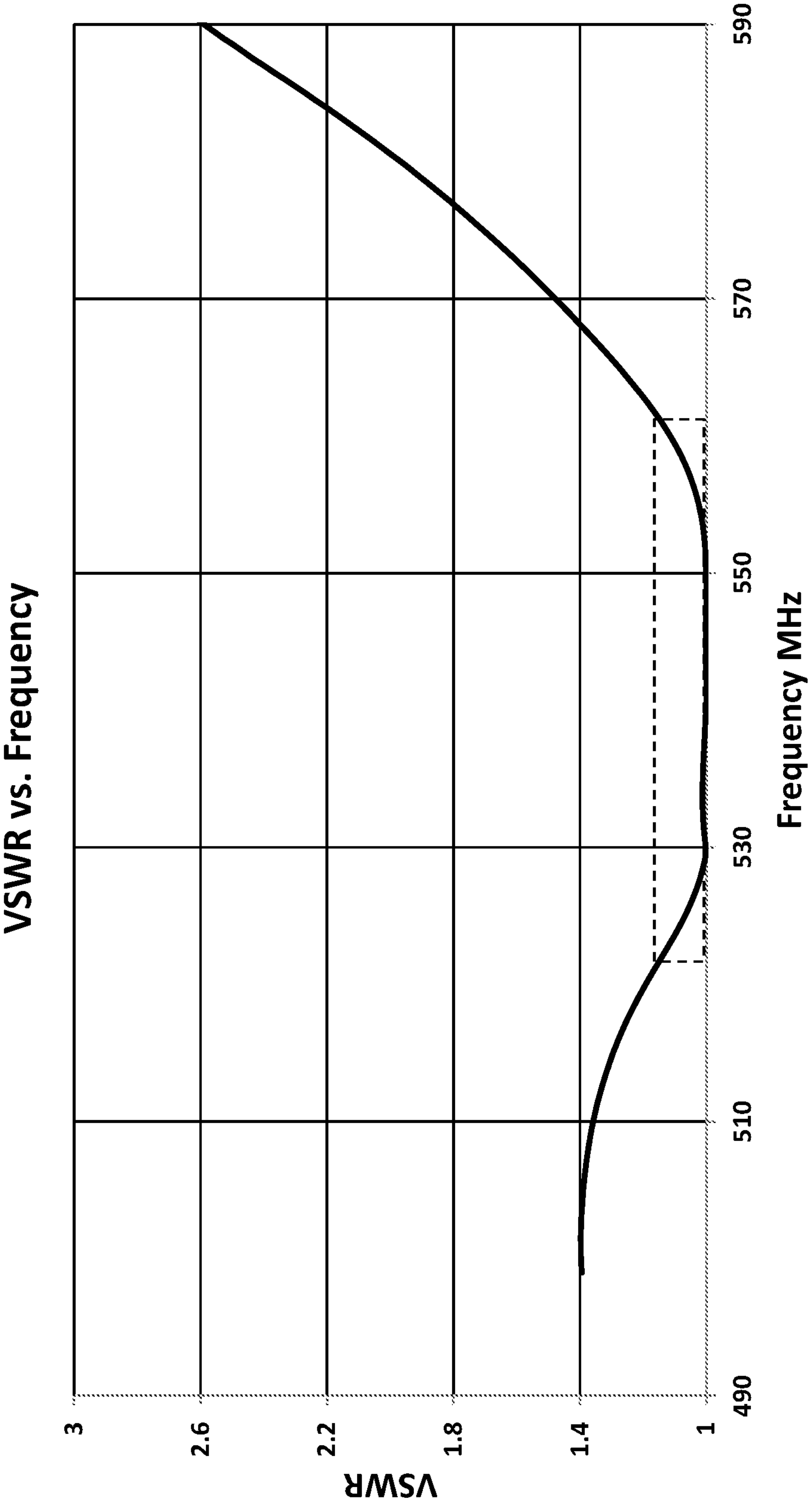

The calculated effect of the impedance summation given the 35 degree offset results in a bandwidth increased to 2.6% for the same allowable VSWR of 1.15:1. Although far from optimal (90 degree offset), this first level of cancellation begins to shrink the impedance spread. Level 2 of cancellation in the example provides 85 degrees of offset. The calculated resulting impedance at point C in FIG. 4 is shown in FIGS. 8A and 8B.

As can be seen, since the 85 degrees of offset is nearly optimal (90 degrees for two loads as given by equation 3) the usable bandwidth for an allowable VSWR of 1.15:1 has increase to 7.2% for the entire antenna array.

Theoretical VS. Practical Application of Phase Cancellation

It must be noted that the above example provides a theoretical maximum bandwidth. It has assumed that the impedances at points A are all identical. This of course is not realistic since no material or manufacturing tolerances have been accounted for and the power splitting points are assumed to have no impedance contribution. Top mounted pylon broadcast antennas are constructed from steel pipe which is at the mercy of steel tolerancing. Standard industry steel pipe which doubles as the outer conductor as well as structural backbone, typically has a tolerance of 12% for the wall thickness. Depending on pipe size, a 12% variation on the outer conductor of a coaxial line will create a compounding 1.05:1 to 1.2:1 VSWR offset at each layer in the antenna. Therefore, the impedances at points C in the example will not be the same and the actual product bandwidth will be reduced from the theoretical maximum.

Real Data—Full Antenna Using Two Level Cancellation

An experimental antenna using the 32-layer design phasing configuration illustrated in FIG. 4 has been implemented as an experimental top-mounted, high-power pylon antenna for channels 26 and 29 combined service in Omaha Nebraska. Dual feeds are used to center feed the bottom half of the antenna from the bottom and center feed the top half of the antenna from the top. The top and bottom sections may be said to have a triaxial conductor structure, with an inner feed layer, a middle radiating layer, and an outer slotted layer. The arrangement is illustrated in FIGS. 9 and 10.

Figure 9:
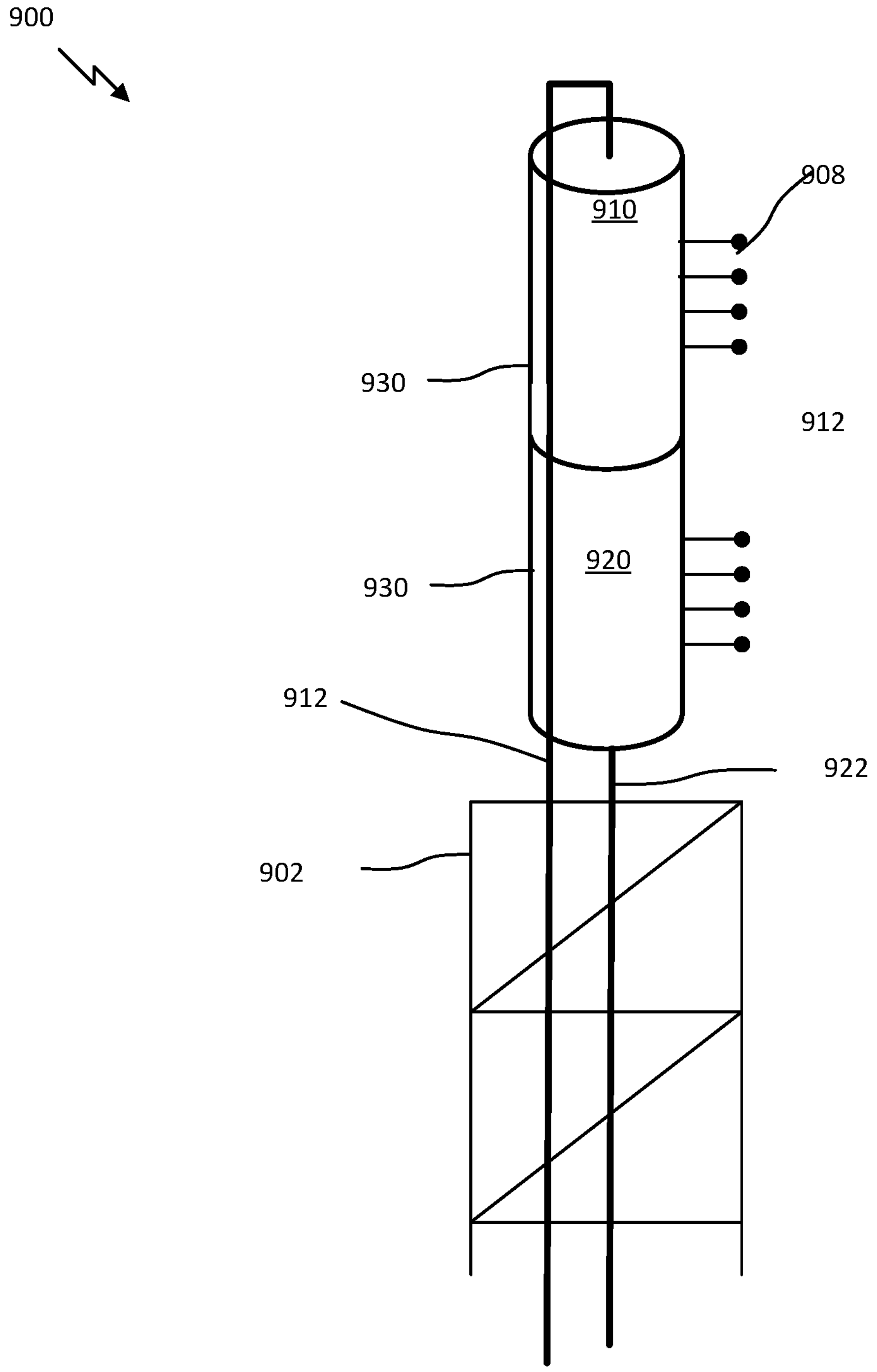
FIG. 9 is a block diagram of an example two-stage top-mounted slotted coaxial antenna on a tower using the phasing of FIG. 4.

In FIG. 9 is a schematic view of outer structure of an antenna 900, which includes a top section 910 and a bottom section 920. The two sections 910 and 920 are top mounted atop a tower 902. Since there is no tower structure to the side of the antenna, and sections 910 and 920 are fitted with climbing steps 908 for maintenance. The climbing steps 908 may be implemented and placed in a variety of ways.

Transmission line feed 922 for bottom section 920 and feed 912 for top section 910 run up the tower 902. Transmission line 912 further runs the length of both sections 920 and 910 to enter the top of section 910, while line 922 enters the bottom of section 920.

Figure 10:
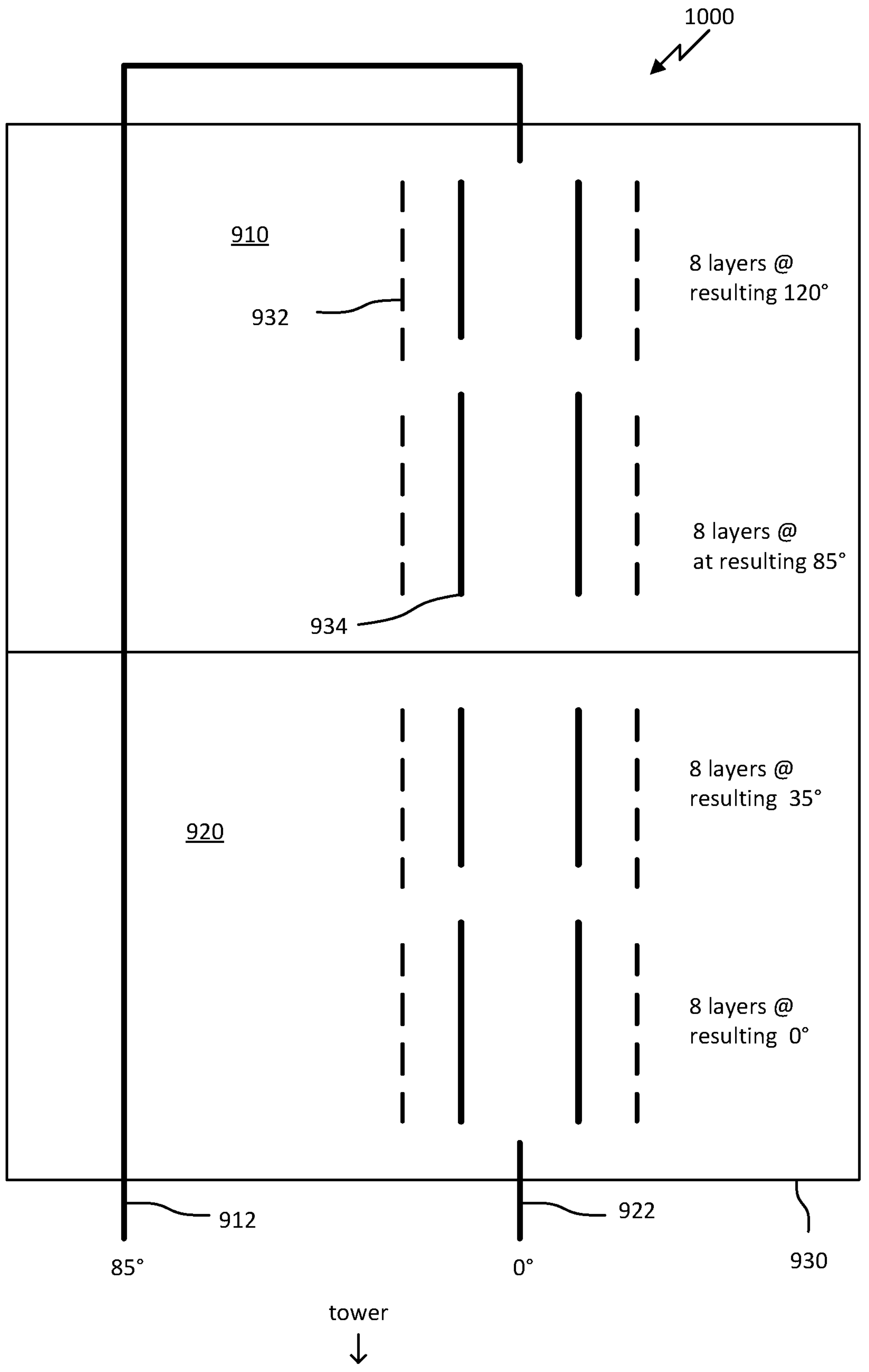
FIG. 10 is a block diagram illustrating internal and of the antenna of FIG. 9.

FIG. 10 is a schematic view 1000 of the interior features of sections 910 and 920 of antenna 900 of FIG. 9. The sections have a non-conductive shroud layer 930. sections 910 and 920 have a slotted layer 932 and a radiator layer 934. In practice, these are often concentric pipes, and they illustrated here as vertical cross-sections of the pipe structures. Note that in practice the slotted aperture layer 932 could have any number of slots. In this example, transmission line 912 runs inside of the shroud 930 and outside of the slotted layer 932.

As implemented in the Omaha experiment, each of upper section 910 and lower antenna section 920 have two sets of slots, which are fed at different phases relative to the feed lines 912 and 922, respectively. The resulting phasing is 0° for eight layers at the bottom of section 920, 35° for eight layers at the top of section 920, 85° for eight layers at the bottom of section 910, and 120° for eight layers at the top of section 910.

Several arrangements for the triaxial center feed mechanism, not shown, are available in practice which do not affecting the slotted coaxial performance of the radiator layers 934 and slotted layers 932 of each subsection of the antenna.

Figure 11:
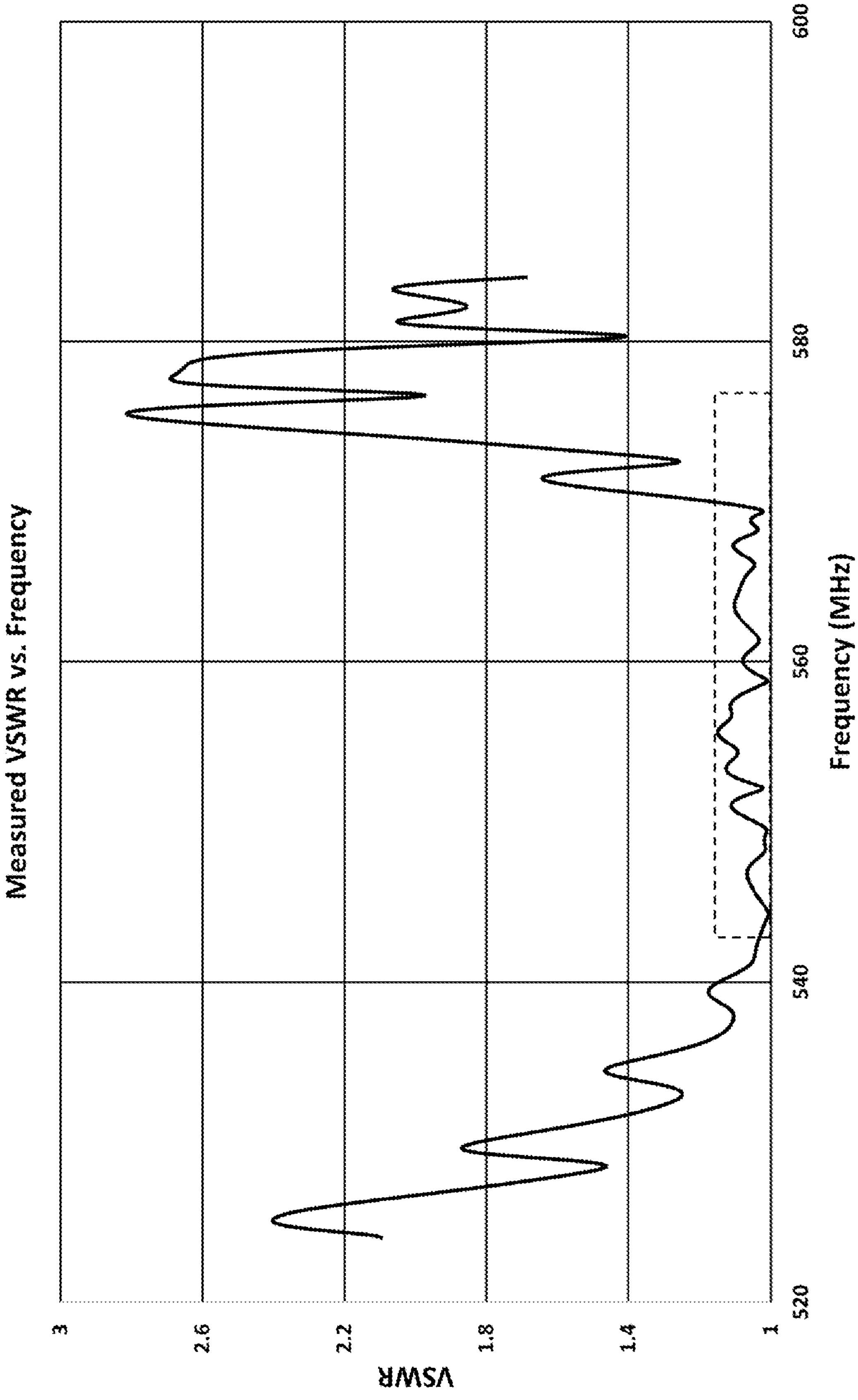
FIG. 11 shows the measured VSWR vs. frequency of an experimental antenna built as shown in FIGS. 9 and 10.

The Omaha antenna of FIGS. 9 and 10 was tested in October of 2021 for broadband performance. The measured VSWR vs. frequency is shown in FIG. 11. The usable measured bandwidth for a maximum allowable VSWR of 1.15 was found to be 5.4%. This value is 75% of the theoretical maximum calculated earlier. The reduction is to be expected and the 75% value would appear to be a good rule of thumb for practical designing.

Azimuth Pattern Circularity

Figure 12:
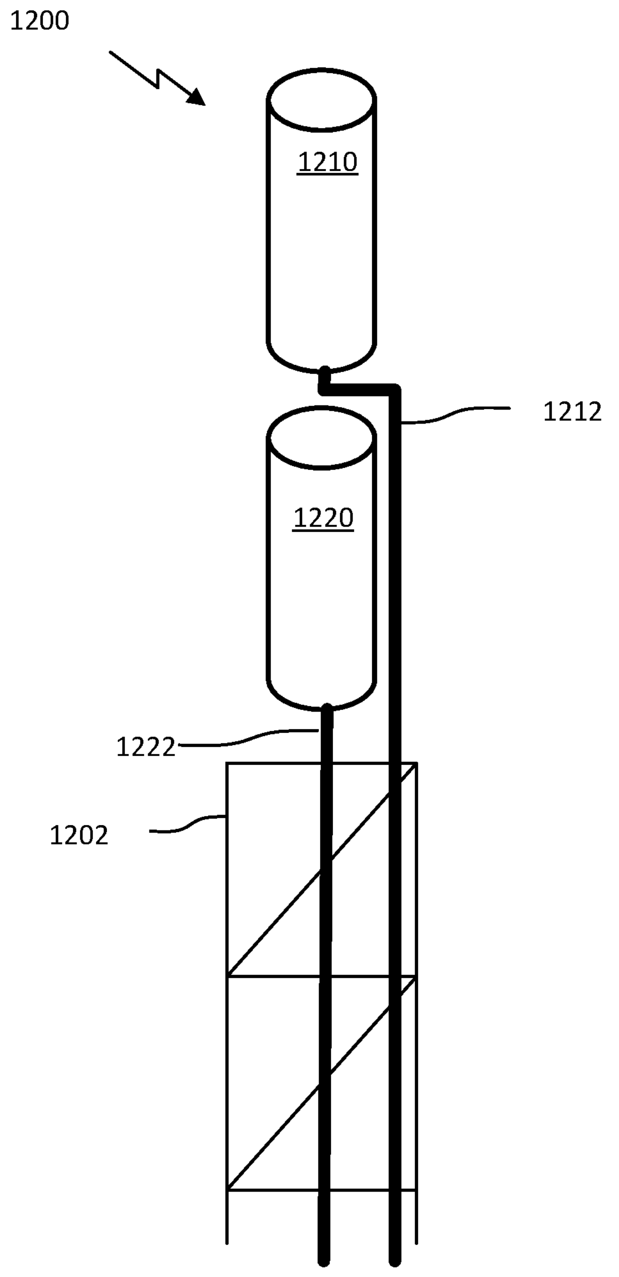
FIG. 12 is a block diagram of an example stacked antenna configuration on a tower that using an external feed to the upper section.

An alternative to the triaxial feeding of the top section of a two-section slotted coaxial antenna is shown in FIG. 12. Here the antenna 1200 has a top section 120 and a bottom section 1220, both atop a tower 1202. The feed 1222 for the lower section 1220 comes up the tower into the lower section. The feed 1212 for the upper section 1210 travels outside of the slotted layer of the lower section 1220. A disadvantage of this technique is the effect of the top antenna's feedline has on the circularity of the bottom antenna. Depending on the power level, which dictates the transmission line size, and the shape of the azimuth pattern, the circularity of the lower antenna could be compromised on the order of one to two decibels.

Figure 13:
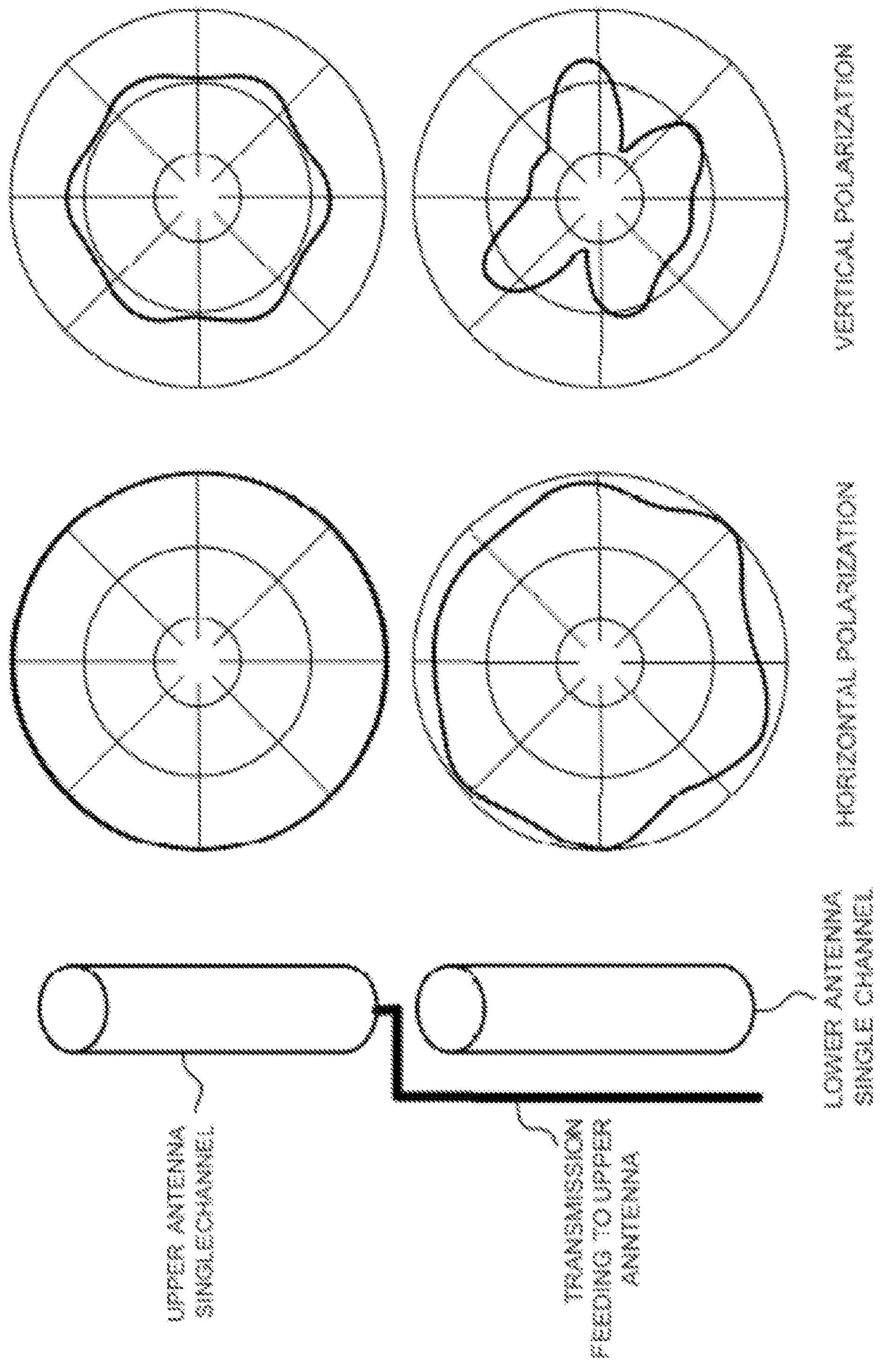
FIG. 13 shows azimuth patterns for the antenna of FIG. 12.

If the antenna is circularity or elliptically polarized, the vertical components circularity is typically worse because the transmission line is placed in the vertical plane. A typical set of elliptically polarized omni/omni stacked antenna patterns at UHF usually look similar to FIG. 13, where the bottom antenna's circularity is affected by the transmission line running up the side of the antenna to feed the upper antenna.

Another disadvantage of the stack configuration is the extra weight and wind load of the second antenna. The development of a new approach has led to improving the circularity of an omni-UHF slotted coaxial when transmission lines are placed in its aperture. This is especially true for the vertical polarization. This is accomplished by placing four symmetrical cylindrical lines around the aperture instead of one. The new approach also accommodates more than one channel thus not needing the second antenna of a stack. This technique was used in Omaha Nebraska and utilized the antenna design described in the previous section. Since only a single feed was necessary to run through the aperture to the upper feed point, three "dummy" parasitic lines are used in conjunction to the live line.

Figure 14:
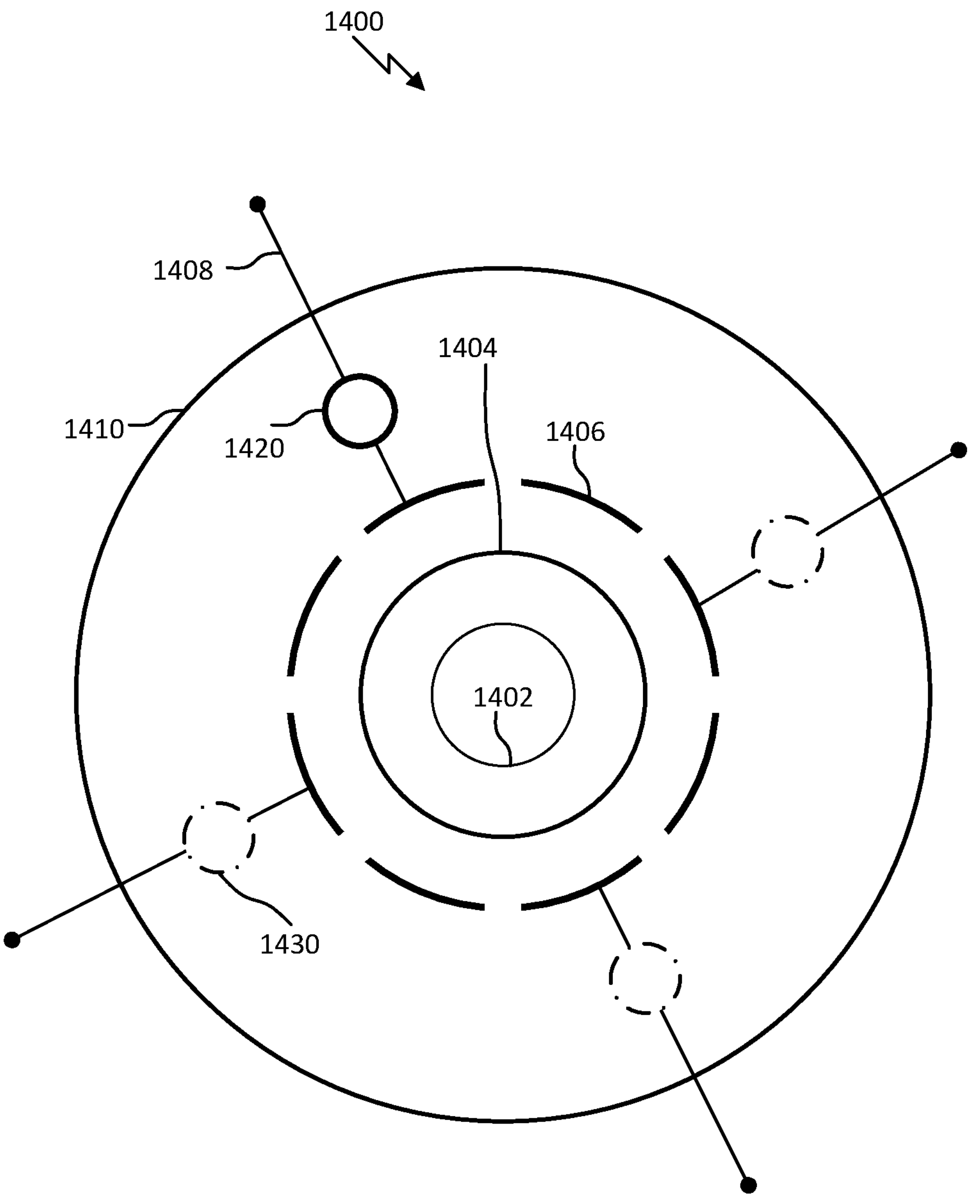
FIG. 14 is a horizontal cross section of an example slotted coax antenna with one transmission line feed and three dummy feed lines near the surface of the aperture.
Figure 15:
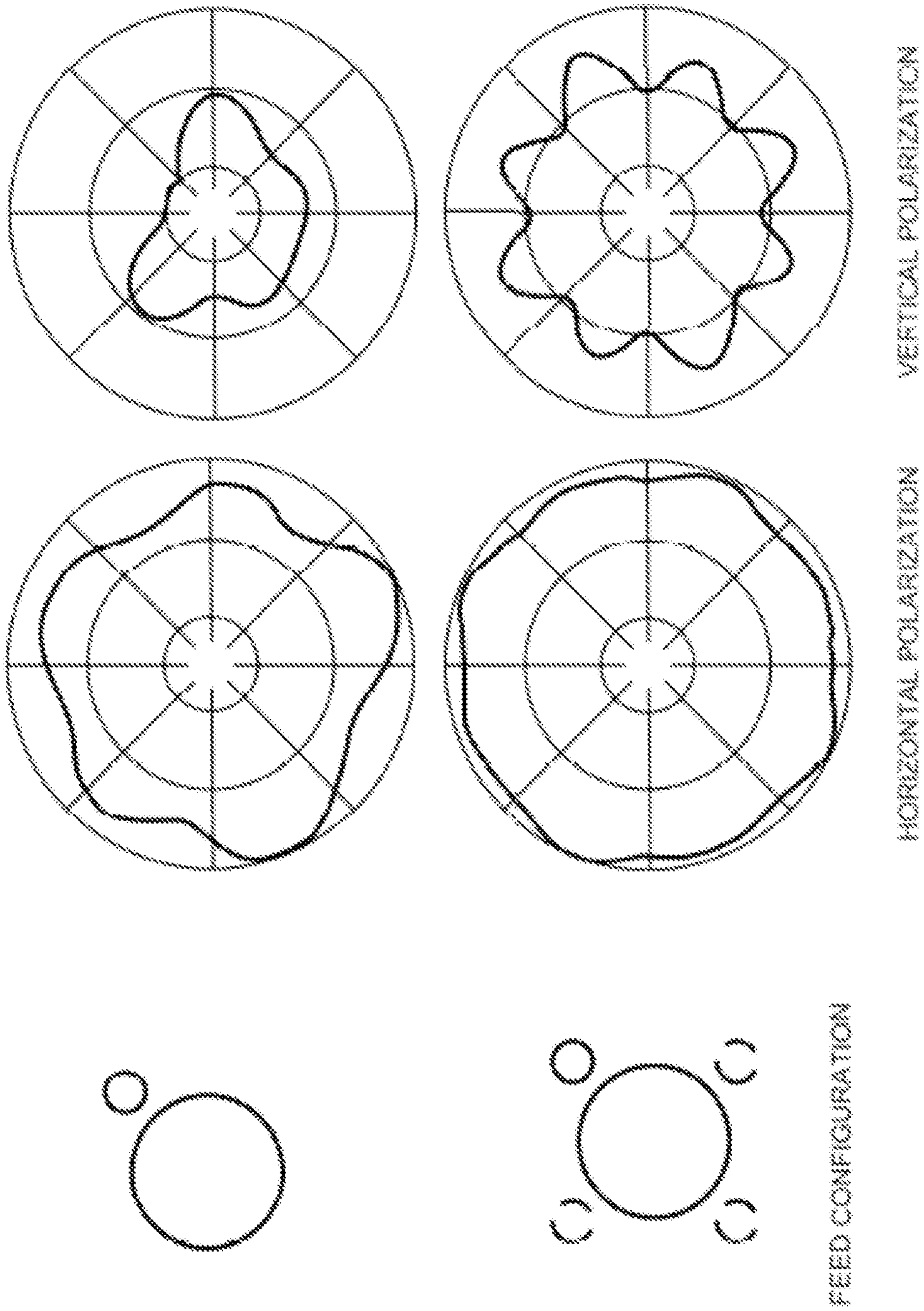
FIG. 15 compares azimuth patterns slotted coax antennas, one antenna having with a single transmission line (top) versus another antenna with a single transmission line and three additional dummy lines (bottom.)

FIG. 14 illustrates a horizontal cross section 1400 of a portion of a top-mounted slotted coaxial pylon antenna using dummy feed lines. Cross-section 1400 shows climbing steps 1408 protruding from a non-conductive shroud 1410. At the center, a triaxial core 1402 may carry a feed through a portion of an antenna section, while radiating surface 1404 and slotted layer 1406 form the active antenna structure. Between the shroud and 1410 and the slotted layer 1406 are four sections of feed line material. In this example, one is a live feed line 1420, and three are dummy feed lines 1430 that carry no signal. A comparison of the azimuth patterns with only the one single active transmission line verses the addition of three parasitic dummy lines are shown in FIG. 15.

Figure 16:
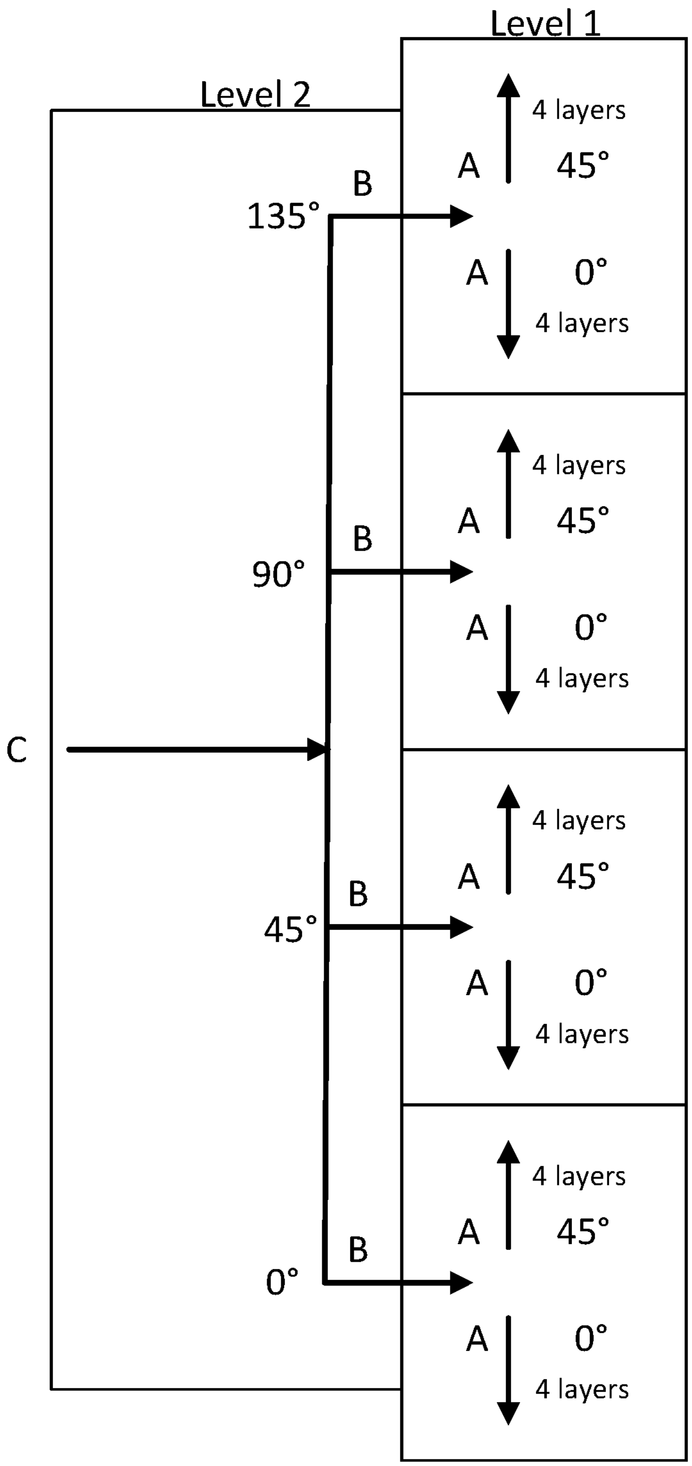
FIG. 16 illustrates an example of phase offsets incorporated into a 32-layer coaxial antenna design to provide more operating bandwidth than the scheme shown in FIG. 4.
Figure 17:
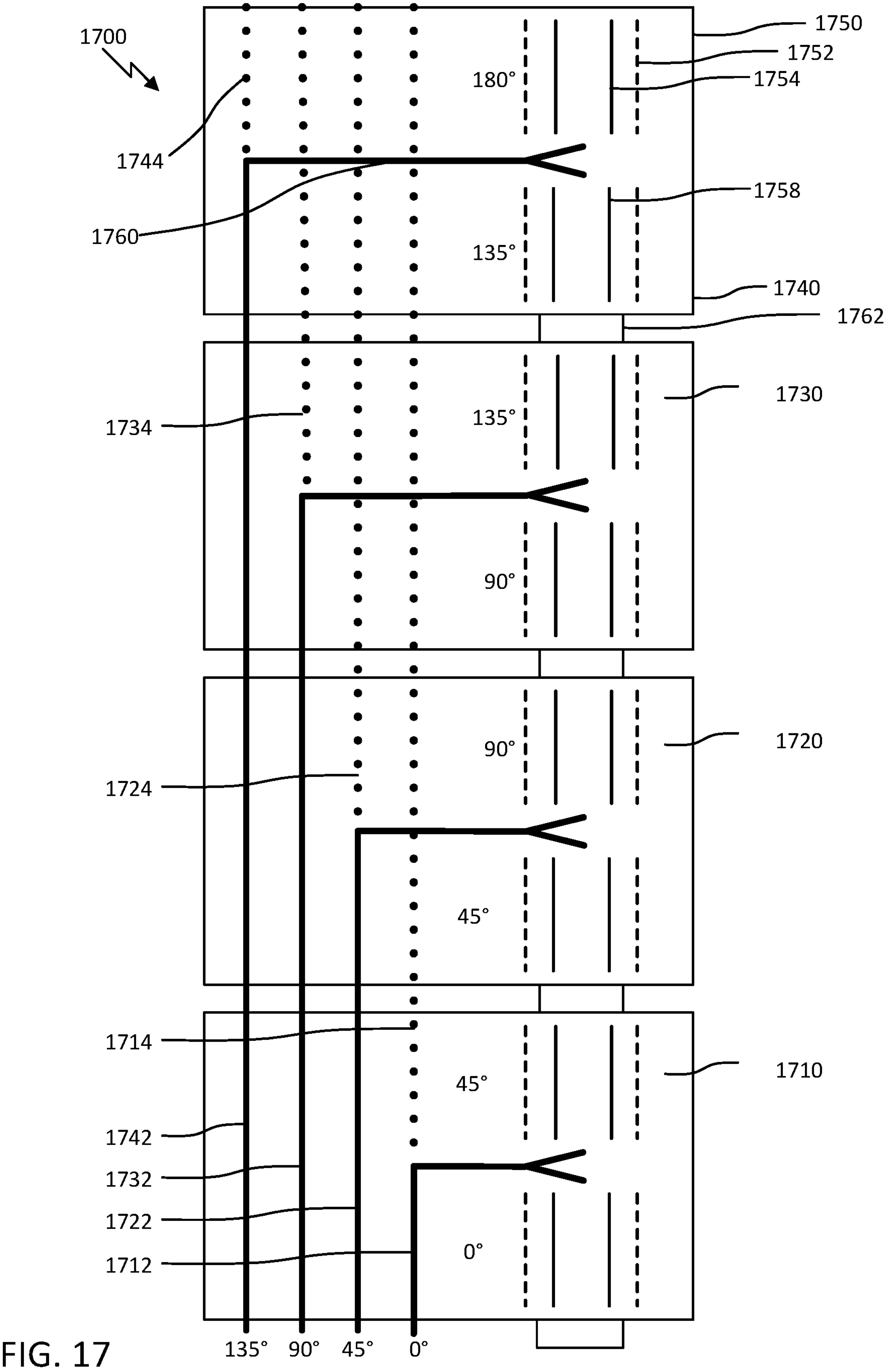
FIG. 17 is a schematic representation of an example antenna with cross-sections similar to that of FIG. 4 and utilizing four tee feeds to implement the phase cancellation scheme shown in FIG. 16.

Expanding Pattern Circularity Improvement Technique to Broader Band Applications In the previous design scheme, only one of the four lines running through the aperture serves a feed purpose. If the other three were used as transmission lines instead of dummy parasitic lines, then more feed point could be added to the array. As previously discussed, if more feed points are added, then the operating bandwidth can be increased using phase cancellation. In a 32-layer design similar to the Omaha design, each of the four lines can be used to center feed four sections of 8 layers. This doubles the number of load sections shown in FIG. 4. The phase offsets used in this new design are shown in FIG. 16. The elevation pattern produced by the phase cancellation scheme shown in FIG. 16 has the same electrical characteristics (beam tilt, null fill, and gain) as that shown in FIG. 5. FIG. 17 depicts the full antenna design utilizing the phase cancellation scheme shown in FIG. 16. Phase offsets incorporated into the 32-layer coaxial antenna design of FIG. 16 provide more operating bandwidth than the scheme shown in FIG. 4.

Please note that the dotted and dashed lines used in FIG. 16 are used for ease of depicting the structure and do not necessarily pertain to which layers are slotted or un-slotted, nor for slotted layers are they intended to convey the number or position of slots used in practice. The figures of physical structures are not drawn to scale.

To analyze the maximum increase in expected bandwidth the quad-feed phase cancellation design can provide, we again can use the typical slotted coaxial antenna impedance shown in FIG. 6 as our load impedances at points A in FIG. 16. Again, note this typical response has 2.0% bandwidth at a maximum allowable VSWR of 1.15:1. The impedance at points B in FIG. 16 with level 1 cancellation of 45-degree offset is shown in FIG. 18.

FIG. 17 is a schematic view of a full antenna 1700 utilizing four tee feeds for the phase cancellation scheme shown in FIG. 16. The antenna 1700 includes dummy feed lines like those described in connection to FIG. 14. As in FIG. 14, antenna 1700 is a slotted coaxial antenna implemented with multiple sections and feed lines. Here in FIG. 17, the antenna structures are shown in vertical cross section to the right and feed lines shown schematically to the left.

In FIG. 17, each of the four stages 1710, 1720, 1730, and 1740 has an outer plastic shroud 1750, a center transmission tee feed 1760, and a mechanical coupling to the structure below the stage (not shown.) Within each stage there is a cylindrical slotted outer antenna surface 1752 concentrically surrounding inner radiating surfaces 1758 and 1754. In the example of FIG. 17, radiating surface 1758 is fed directly from the center transmission feed 1760, while surface 1754 is fed from the central transmission tee feed 1760.

As described in connection with FIG. 14, the vertical feeds may be spaced physically at 90 degree increments around the horizontal perimeter of the antenna outside of the slotted antenna aperture surface 1752. For ease of depiction, the vertical feeds are shown to the left of the antenna structures in FIG. 17, but in practice they would be arranged as shown in FIG. 14.

To achieve better radiation patterns, the effects of the vertical feeds are balanced by providing dummy feed sections extending the full length of the pylon antenna 1700. In the example of FIG. 17, dummy section 1714 is the longest, extending from the center feed of the bottom stage 1710 to the top of the top stage 1740. Dummy feeds 1724, 1734, and 1744 similarly extend from the center feed of their respective stages 1720, 1730, and 1740 to the top of stage 1740.

Each stage of FIG. 17 receives a separate transmission feed from the tower below. (The tower structure is not shown in FIG. 17.) Vertical feeds 1712, 1722, 1732, and 1742 feed stages 1710, 1720, 1730, and 1740, at 0°, 45°, 90°, and 145° respectively. Within each section 1710, 1720, 1730, and 1740, different sets of slots may be driven at different phases. For example, each section may have two subsections, each having four slots each. In the example of FIG. 17, the subsections are driven at 450 relative to each other, resulting in the phases of the eight of subsections in FIG. 17, from bottom top, being at 0°, 45°, 45°, 90°, 90°, 135°, 135°, and 145° respectively.

This technique of balancing plural outer feeds with dummy feed sections may be applied in any number of ways. For example, any number of vertical feeds and stages may be used. Each stage may be bottom fed, center fed, or top fed. Each stage may or may not take advantage of triaxial feed distribution. Different stages on the same antenna may take advantage of different feed arrangements. Similarly, different stages and different portions of stages may use different numbers, sizes, or placements of slots.

Figure 18A:
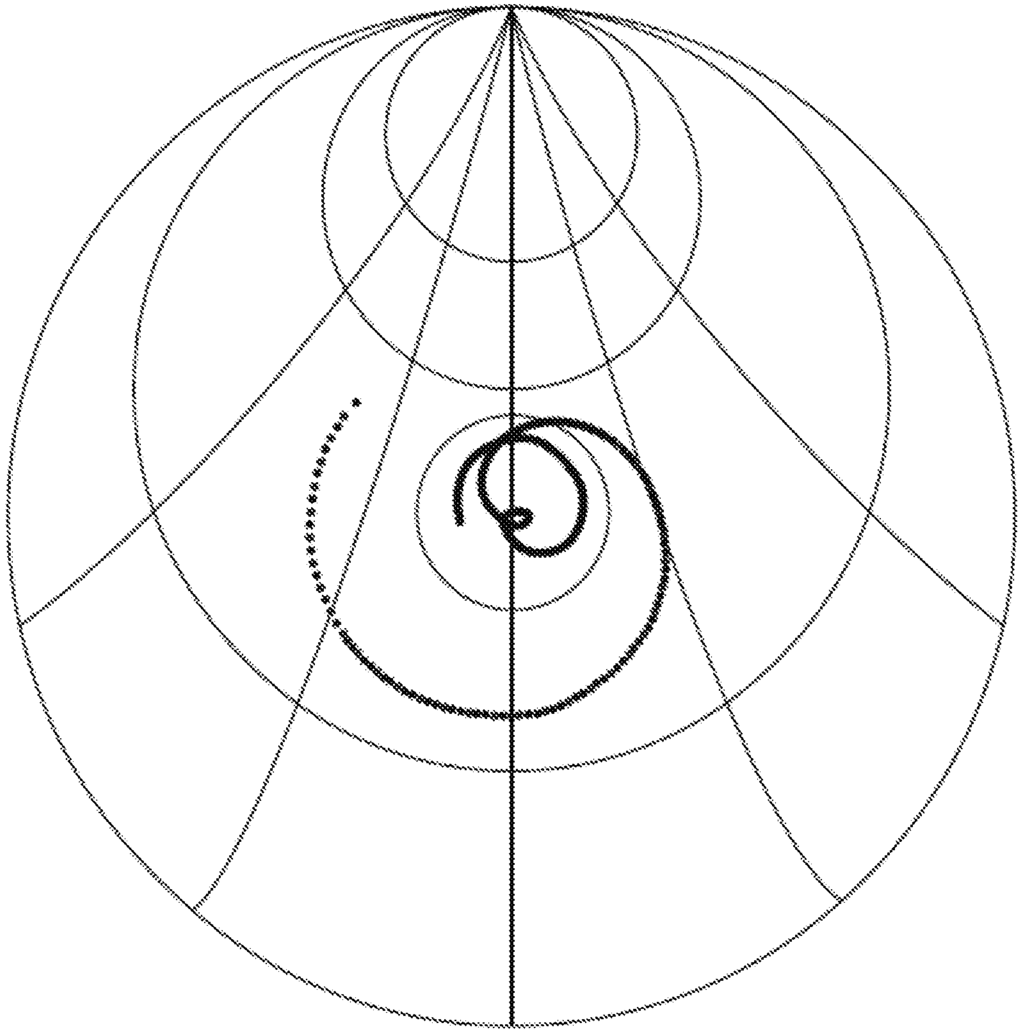
FIG. 18 are a Smith chart and a VSWR response graph for points B in FIG. 16.
Figure 18B:
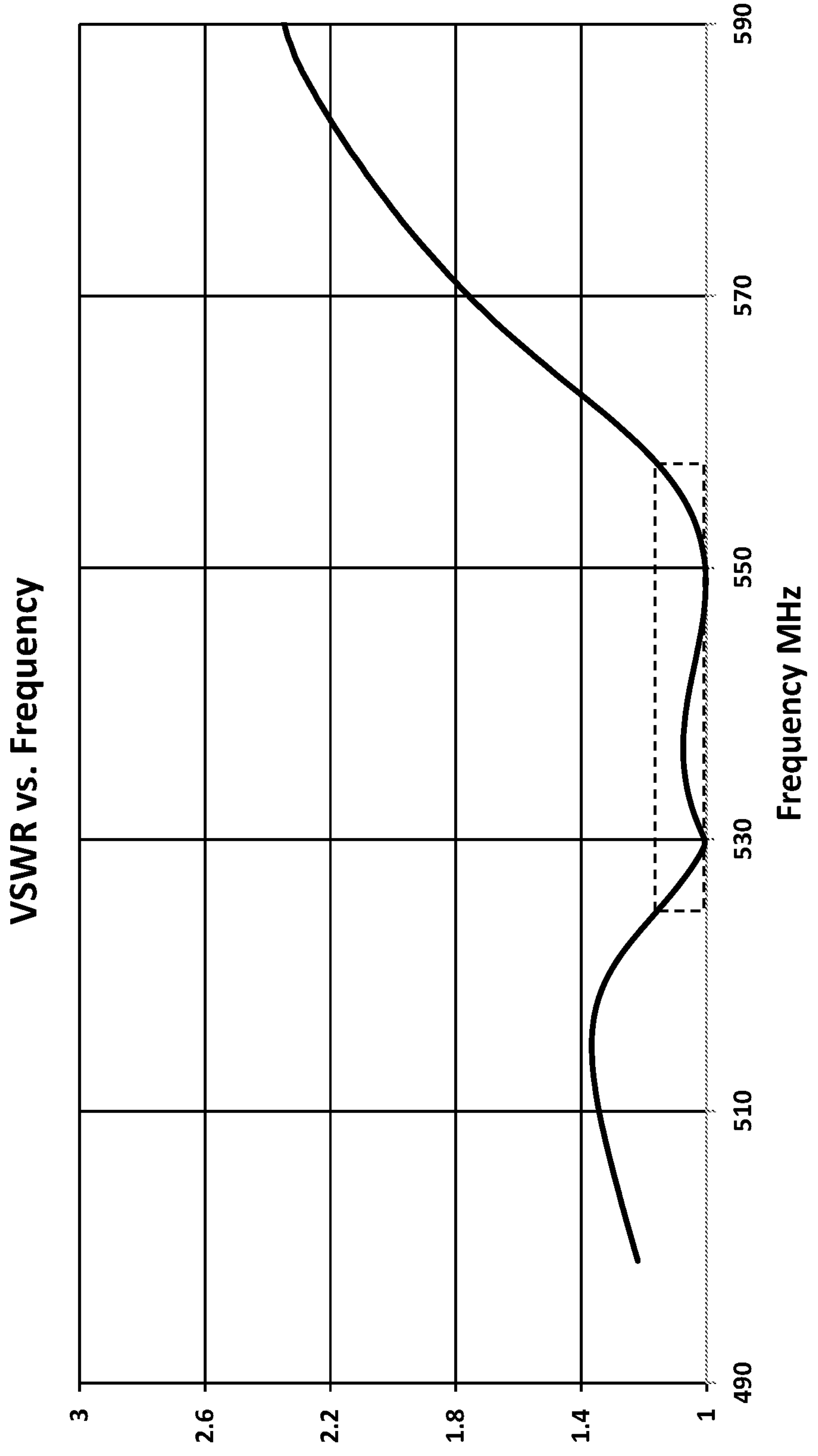
Figure 19A:
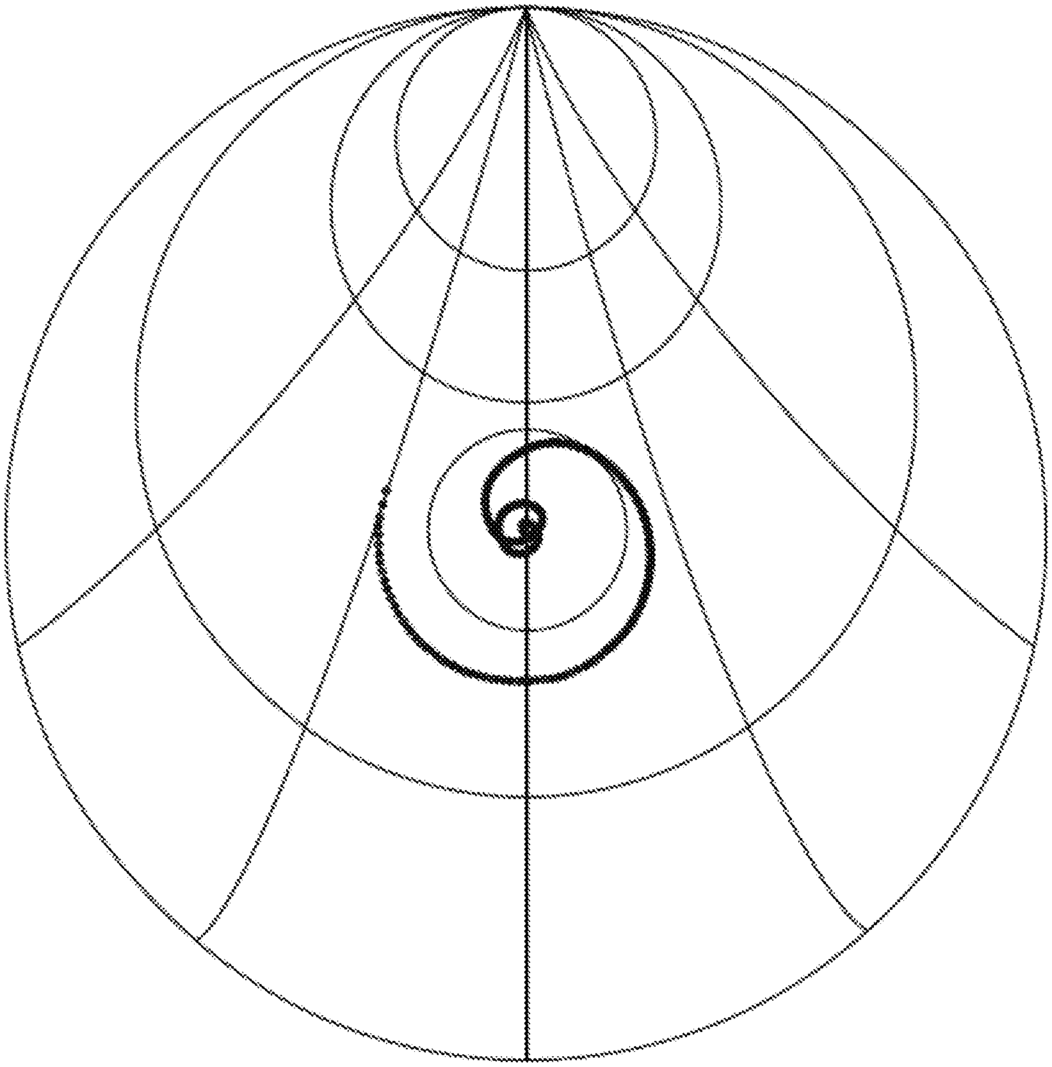
FIG. 19 are a Smith chart and a VSWR response graph calculated for point C in FIG. 16.
Figure 19B:
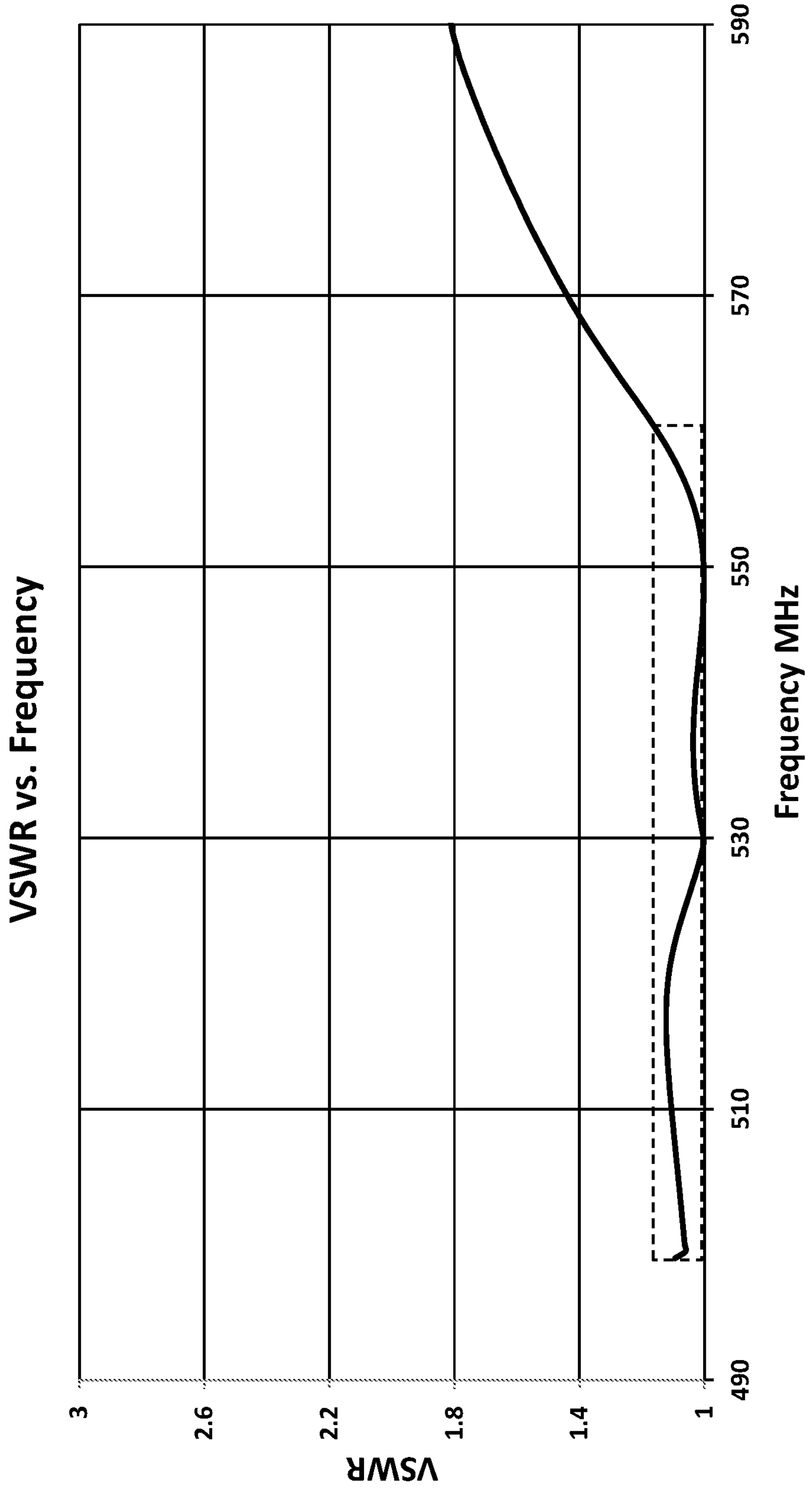

FIGS. 18A and 18B show the calculated impedance and VSWR response at points B in FIG. 16. The calculated effect of the impedance summation in this case, given the 45-degree offset, results in a bandwidth increase to 5.8% for the same allowable VSWR of 1.15:1. As seen again, this first level of cancellation shrinks the impedance spread. Level 2 of cancellation for the four-feed design uses 0-, 45-, 90-, and 135-degree phase offsets. Referring to equation 3, this is optimal. The calculated resulting impedance at point C in FIG. 16 is shown in FIG. 19.

The usable bandwidth for an allowable VSWR of 1.15:1 has increase to 11.8% for the entire antenna array. This is substantially higher than the dual triax design discussed earlier. If the 75% rule of thumb is applied to the quad tee design, the overall expected operating bandwidth is 8.9% which can effectively cover eight UHF channels.

The invention claimed is:

1. An antenna, comprising: a plurality of stages, each stage comprising either one section or two or more adjacent sections of slotted coaxial antenna arranged in phase groups along a central vertical axis; and for each stage, an exterior feedline running parallel to the central vertical axis and radially exterior to the slotted outer layer of each section, the exterior feedline comprising a dummy portion, wherein: each section belongs to only one stage; the feedlines are space equally radially around the central vertical axis; each section comprises a cylindrical inner radiating layer with a first radius from the central vertical axis and a first height along the central vertical axis; each section comprises a cylindrical outer slotted layer with a second radius from the central vertical axis and a second height along the central vertical axis, the second radius being greater than the first radius; each outer slotted layer comprising an array of vertical slots, the array comprising a number of slots vertically and a number of slots radially, such that the number of slots per section is the product of the number of slots vertically and the number of slots radially; each phase group comprises one or more adjacent sections arranged along the central vertical axis, wherein each section belongs to only one phase group; and the antenna is driven such that a transmission phase of each phase group is separated from a transmission phase of any adjacent phase group by between 30 and 60 degrees.

2. The antenna of claim 1, having four phase groups, the four phase groups being a first, a second, a third, and a fourth phase group sequentially, along the central vertical axis, from a bottom of the antenna to a top of the antenna along the central vertical axis, the four phase groups having a nominal transmission phasing of 0, 35, 85, and 120 degrees, respectively.

3. The antenna of claim 2, wherein each phase group has one section.

4. The antenna of claim 3, wherein the array of vertical slots of each section has 4 slots vertically.

5. The antenna of claim 4, wherein the array of vertical slots of each section has 8 slots radially, such that each section has 32 vertical slots.

6. The antenna of claim 2, comprising:

a first feedline from a tower, the first feedline supplying, at the bottom of the antenna, signal to the first phase group and the second phase group, the first feedline running from the tower to the bottom of the antenna; and a second feedline from the tower, the second feedline supplying, at the top of the antenna, signal to the third phase group and the fourth phase group; the second feedline running from the tower to the top of the antenna along a course comprising a portion radially exterior to the slotted outer layer of each section.

7. The antenna of claim 6, comprising:

a first triaxial feedline running, radially interior to the inner radiating layer of the first phase group, from the bottom of the antenna to the second phase group; and a second triaxial feedline running, radially interior to the inner radiating layer of the fourth phase group, from the top of the antenna to the third phase group.

8. The antenna of claim 2, wherein the transmission phasing of each phase group is within 10% of the nominal transmission phasing of said phase group.

9. The antenna of claim 2, wherein the transmission phasing of each phase group is within 5% of the nominal transmission phasing of said phase group.

10. The antenna of claim 1, having five phase groups, the five phase groups being phase group 1 through phase group 5, sequentially along the central vertical axis, from a bottom of the antenna to a top of the antenna, the five phase groups having a nominal transmission phasing of 0, 45, 90, 135, and 180 degrees, respectively.

11. The antenna of claim 10, wherein the transmission phasing of each phase group is within 10% of the nominal transmission phasing of said phase group.

12. The antenna of claim 10, wherein the transmission phasing of each phase group is within 5% of the nominal transmission phasing of said phase group.

13. The antenna of claim 10, having 8 sections, being sections 1 through 8 sequentially, along the central vertical axis, from the bottom of the antenna to the top of the antenna, wherein:

phase group 1 includes section 1;
phase group 2 includes section 2 and section 3;
phase group 3 includes section 4 and section 5;
phase group 4 includes section 6 and section 7, and
phase group 5 includes section 8.

14. The antenna of claim 11, comprising four stages, being stage 1 through stage 4, wherein:

stage 1 includes section 1 and section 2;
stage 2 includes section 3 and section 4;
stage 3 includes section 5 and section 6;
stage 4 includes section 7 and section 8; and
the feedline for each stage comprises an active portion from the bottom of the antenna to a mid-point feed for each stage, and a dummy portion the mid-point feed for said stage to the top of the antenna.

15. The antenna of claim 12, wherein the array of vertical slots of each section has 4 slots vertically.

16. The antenna of claim 13, wherein the array of vertical slots of each section has 8 slots radially, such that each section has 32 vertical slots.

* * * * *